United States Patent
Cao et al.

(10) Patent No.: US 12,433,289 B2
(45) Date of Patent: Oct. 7, 2025

(54) COMPOSITIONS AND METHODS OF CRYOPRESERVING CELLS

(71) Applicant: Takeda Pharmaceutical Company Limited, Osaka (JP)

(72) Inventors: Lan Cao, Cambridge, MA (US); Hui-Hsin Chang, Cambridge, MA (US); Jianxin Hu, Cambridge, MA (US); Xi Shi, Cambridge, MA (US); Yutaka Nishimoto, Shonan (JP)

(73) Assignee: Takeda Pharmaceutical Company Limited, Osaka (JP)

( * ) Notice: Subject to any disclaimer, the term of this patent is extended or adjusted under 35 U.S.C. 154(b) by 543 days.

(21) Appl. No.: 17/153,458

(22) Filed: Jan. 20, 2021

(65) Prior Publication Data

US 2021/0315198 A1    Oct. 14, 2021

Related U.S. Application Data

(60) Provisional application No. 62/964,074, filed on Jan. 21, 2020.

(51) Int. Cl.
*A01N 1/126*    (2025.01)
*A01N 1/125*    (2025.01)

(52) U.S. Cl.
CPC ............ *A01N 1/125* (2025.01); *A01N 1/126* (2025.01)

(58) Field of Classification Search
CPC ........................... A01N 1/0221; A01N 1/0226
See application file for complete search history.

(56) References Cited

U.S. PATENT DOCUMENTS

| | | | |
|---|---|---|---|
| 5,580,714 A | 12/1996 | Polovina et al. | |
| 9,055,739 B2 | 6/2015 | Kato et al. | |
| 2010/0240127 A1 | 9/2010 | Mcgann et al. | |
| 2013/0195806 A1 | 8/2013 | Gay et al. | |
| 2018/0092348 A1* | 4/2018 | She | C12N 5/0693 |
| 2018/0295834 A1 | 10/2018 | Reid et al. | |
| 2019/0136197 A1 | 5/2019 | Iwata et al. | |
| 2019/0350978 A1* | 11/2019 | Beauchesne | A61P 35/00 |
| 2020/0330983 A1* | 10/2020 | Wesner | B01L 3/5082 |
| 2021/0267190 A1* | 9/2021 | Bessette | A01N 1/021 |

FOREIGN PATENT DOCUMENTS

| | | | |
|---|---|---|---|
| CN | 104 694 472 A | | 6/2015 |
| CN | 106 591 233 A | | 4/2017 |
| CN | 107012119 A | | 8/2017 |
| CN | 107047541 A | | 8/2017 |
| CN | 109744226 A | * | 5/2019 |
| CN | 111 235 105 A | | 6/2020 |
| WO | WO 02/16560 A1 | | 2/2002 |
| WO | 2015/062267 A1 | | 5/2015 |
| WO | 2016/063208 A1 | | 4/2016 |
| WO | 2018064976 A1 | | 4/2018 |
| WO | WO 2018/170188 A2 | | 9/2018 |
| WO | 2019/094835 A1 | | 5/2019 |
| WO | 2020/014245 A1 | | 1/2020 |
| WO | WO 2021/041399 A1 | | 3/2021 |

OTHER PUBLICATIONS

Hreinsson et al ("Cryopreservation of follicles in human ovarian cortical tissue. Comparison of serum and human serum albumin in the cryoprotectant solutions," Human Reproduction vol. 18, No. 11 pp. 2420±2428, 2003), (Year: 2003).*

Jennes et al ("Enhanced ELISPOT detection of antigen-specific T cell responses from cryopreserved specimens with addition of both IL-7 and IL-15—the Amplispot assay;" Journal of Immunological Methods 270 (2002) 99-108). (Year: 2022).*

R. Ian Freshney, "Cryopreservation." In: Culture of Animal Cell: A Manual of Basic Technique and Specialized Applications. (Hoboken, NJ, John Wiley & Sons, Inc., 2010), pp. 317-334. QH585.2.F74 2010 (Year: 2010).*

R. Ian Freshney, âCryopreservation.â and âDefined Media and Supplementsâ in: Culture of Animal Cell: A Manual of Basic Technique and Specialized Applications. (Hoboken, NJ, John Wiley & Sons, Inc., 2010), pp. 99-114, 317-334. QH585.2.F74 2010 (Year: 2010).*

Biolife Solutions, Inc., CryoStar® CS2, CS5, CS10, Safety Data Sheet, Sep. 19, 2018, 1-11, 6029_01, Bothell, WA 98021, USA.

International Search Report and Written Opinion for PCT/US21/14114, mailed Jun. 7, 2021 (14 pages).

Baust, et al., "Cryopreservation, An Emerging Paradigm Change", Organogenesis 5:3, 90-96; Jul./Aug./Sep. 2009; © 2009 Landes Bioscience (7 pages).

Li, et al., "Preservation of Cell-based Immunotherapies for Clinical Trials", HHS Public Access, Author Manuscript, Cytotherapy Sep. 2019 (available in PMC Sep. 1, 2020); 21(9): 943-957. doi:10.1016/j.jcyt.2019.07.004 (25 pages).

Arando, et al., "Storage temperature and sucrose concentrations affect ram sperm quality after vitrification", Anim Reprod Sci., 2017, vol. 181, pp. 175-185 (29 pages accepted manuscript).

Fry, et al., "Assessing the toxic effects of DMSO on cord blood to determine exposure time limits and the optimum concentration for cryopreservation", Vox Sang., 2015, vol. 109, No. 2, pp. 181-190 (10 pages).

* cited by examiner

*Primary Examiner* — Kara D Johnson
(74) *Attorney, Agent, or Firm* — Proskauer Rose LLP

(57) ABSTRACT

The present disclosure provides, among other things, a cryopreservation medium for cryopreserving mammalian cells, the medium comprising: dimethyl sulfoxide (DMSO), disaccharide, human serum, and IL-7 and/or IL-15. The present disclosure also provides, among other things, a cryopreservation medium for cryopreserving mammalian cells, the medium comprising: between about 1 w/v % and 10 w/v % dimethyl sulfoxide (DMSO), between about 0.25 w/v % and 5 w/v % disaccharide, and between about 10 w/v % and 90 w/v % human serum. The present disclosure also provides, among other things, a cryopreservation medium for cryopreserving mammalian cells, the medium comprising: between about 1 w/v % and 10 w/v % dimethyl sulfoxide (DMSO), between about 0.25 w/v % and 5 w/v % disaccharide, and between about 0.5 w/v % and 30 w/v % human serum albumin.

22 Claims, 27 Drawing Sheets

Different cryo-formulations to cryopreserve wild-type iCART cells

| Cryo-formulation Number (#) | Number of Mice (n) | Activation/Transduction Day | Treatment Groups |
|---|---|---|---|
| | 5 | | Nalm6 cells in PBS (Control) |
| | 5 | | Primary CART cells |
| | 4 | 4/7 | Fresh CART cells |
| 1 | 3 | 4/8 | CS10 |
| 2 | 1 | 4/8 | Stem Cellbanker |
| 3 | 2 | 4/8 | BamBanker hRM |
| 4 | 1 | 4/8 | 50% CS10 + 50% EM* (IMDM + 15% Human serum, w/ Cytokines#) |
| 5 | 1 | 4/8 | 50% CS10 + 50% EM* (IMDM + 15% Human serum) |
| 6 | 2 | 4/8 | 50% CS10 + 50% EM* (IMDM + 5% Human serum albumin) |
| 7 | 1 | 4/8 | 80% Human Serum + 10%DMSO + 10% EM* (IMDM + 15% Human serum, w/ Cytokines#) |
| 8 | 1 | 4/8 | 80% Human Serum + 10%DMSO + 10% EM* (IMDM + 15% Human serum) |
| 9 | 2 | 4/10 | 50% CS10 + 50% EM* (IMDM + 15% Human serum, w/ Cytokines#) |
| 10 | 2 | 4/8 | 50% CS10 + 50% Human Serum w/Cytokines |
| 11 | 2 | 4/8 (different source) | 50% CS10 + 50% EM* (IMDM + 5% Human serum albumin) |

FIG. 1

*In vivo* efficacy of wild-type iCART cells cryopreserved using cryo-formulation #2, cryo-formulation #6, and cryo-formulation #10

| Cryo-formulation number (#) | Number of Mice (n) | Activation/Transduction Day | Treatment Groups | 1st Dose 1E7 CAR+ (15-Nov-2019) | 2nd Dose 1E7/5E6 CAR+ (19-Nov-2019) |
|---|---|---|---|---|---|
|  | 5 |  | Primary CART cells | 1.00E+07 | N/A |
|  | 4 | 4/7 | Fresh CART cells | 1.00E+07 | N/A |
| 2 | 1 | 4/8 | Stem Cellbanker | 1.00E+07 | 1.00E+07 |
| 6 | 2 | 4/8 | 50% CS10 + 50% EM* (IMDM + 5% Human serum albumin) | 1.00E+07 | 1E7 (1 mouse) |
| 10 | 2 | 4/8 | 50% CS10 + 50% Human Serum w/Cytokines | 1.00E+07 | N/A |

FIG. 3A

Experimental design to evaluate the effect of washing of cryo-formulations on the in vivo efficacy of wild-type iCART cells

| Group | Treatment Groups | Cryo-formulations | Dose | Route/Regimen | Target cell | n |
|---|---|---|---|---|---|---|
| 1 | PBS control | | 0 | iv/1 shot | Nalm6-luc/iv | 5 |
| 2 | Primary CART control | | 5.0 E6 | iv/1 shot | Nalm6-luc/iv | 5 |
| 3 | Formulation 1, no wash | 50% CS10 + 50% Expansion medium (IMDM + 15% Human serum + Cytokines*) | 1.5 E7 | iv/1 shot | Nalm6-luc/iv | 5 |
| 4 | Formulation 1, low | 50% CS10 + 50% Expansion medium (IMDM + 15% Human serum + Cytokines*) | 1.5 E7 | iv/1 shot | Nalm6-luc/iv | 5 |
| 5 | Formulation 1, high | 50% CS10 + 50% Expansion medium (IMDM + 15% Human serum + Cytokines*) | 4.0 E7 | iv/1 shot | Nalm6-luc/iv | 5 |
| 6 | Formulation 2, no wash | 50% CS10 + 50% Expansion medium (IMDM + 5% HSA + Cytokines*) | 1.5 E7 | iv/1 shot | Nalm6-luc/iv | 5 |
| 7 | Formulation 2, low | 50% CS10 + 50% Expansion medium (IMDM + 5% HSA + Cytokines*) | 1.5 E7 | iv/1 shot | Nalm6-luc/iv | 5 |
| 8 | Formulation 2, high | 50% CS10 + 50% Expansion medium (IMDM + 5% HSA + Cytokines*) | 4.0 E7 | iv/1 shot | Nalm6-luc/iv | 5 |
| 9 | Formulation 3, no wash | STEM-CELLBANKER® GMP grade | 1.5 E7 | iv/1 shot | Nalm6-luc/iv | 5 |
| 10 | Formulation 3, low | STEM-CELLBANKER® GMP grade | 1.5 E7 | iv/1 shot | Nalm6-luc/iv | 5 |
| 11 | Formulation 3, high | STEM-CELLBANKER® GMP grade | 4.0 E7 | iv/1 shot | Nalm6-luc/iv | 5 |

*Cytokines: IL-7 and IL-15 at the final concentration of 5ng/mL

FIG. 4

| Condition# | Conditions |
|---|---|
| 1 | 50% CS-10, 50% culture media (expansion media with cytokine and 15% human serum) |
| 2 | 80% human serum and 10% culture media (expansion media with cytokine and 15% human serum) and 10% DMSO containing 5% (w/v) sucrose |
| 3 | CS10 |
| 4 | 90% CS-10, 10% culture media (expansion media with cytokine and 15% human serum) |
| 5 | Stem Cell Banker GMP |

FIG. 7A

| Group | effector cell | Condition # | Frozen stock term | Description | dose | n |
|---|---|---|---|---|---|---|
| Gr-1 | control | | - | Control. | | 5 |
| Gr-2 | iCART, fresh | 1 | 7 days | Expanded for 7 days. iCART cells collected and administrated without additional formulation. | 1x10^7 | 5 |
| Gr-3 | iCART, cryostock | 1 | 14 days | Cultured for 3 days. iCART cells collected and administrated without additional formulation. | 1x10^7 | 5 |
| Gr-4 | iCART, fresh | 2 | 7 days | Expanded for 7 days. iCART cells collected and administrated without additional formulation. | 1x10^7 | 5 |
| Gr-5 | iCART, cryostock | 2 | 14 days | Cultured for 3 days. iCART cells collected and administrated without additional formulation. | 1x10^7 | 5 → 4 |
| Gr-6 | iCART, fresh | 3 | 7 days | Collected and administrated without additional formulation. | 1x10^7 | 5 |
| Gr-7 | iCART, cryostock | 3 | 14 days | Collected and administrated without additional formulation. | 1x10^7 | 5 |
| Gr-8 | iCART, cryostock | 4 | 14 days | Cultured for 3 days. iCART cells collected and administrated without additional formulation. | 1x10^7 | 5 |
| Gr-9 | iCART, cryostock | 5 | 14 days | Cultured for 3 days. iCART cells collected and administrated without additional formulation. | 1x10^7 | 3 → 1 |
| Gr-10 | iCART, cryostock | 3 | 17 days | Washed and administrated. | 1x10^7 | 4 → 1 |
| Gr-11 | iCART, cryostock | 4 | 17 days | Washed and administrated. | 1x10^7 | 4 → 1 |
| Gr-12 | Primary CART (cryo) | | - | 100% CS10. | 5x10^6 | 5 |

FIG. 7B

Experimental design to evaluate and compare the *in vivo* efficacy of fresh iCART cells vs cryostock iCART cells

Cryo-formulations to cryopreserve iCART cells

| Formulation # | Formulations |
|---|---|
| #1 | 80%HS+10%EM+10%DMSO w/ Cytokine |
| #2 | 80%HS+10%EM+10%DMSO w/o Cytokine |
| #3 | CS10:EM (HS)=1:1 w/ Cytokine |
| #4 | CS10:EM (Albminar)=1:1 w/o Cytokine |
| #5 | CS10:EM (HS)=1:1 w/o Cytokine |
| #6 | CS10:WB=2:1 |
| #7 | CS10:WB=1:1 |
| #8 | StemCell Banker:WB = 2:1 |
| #9 | BamBanker hRM:WB= 2:1 |
| #10 | CS10:HS=1:1 w/ Cytokine |
| #11 | CS10:HS=1:1 w/o Cytokine |
| #12 | StemCell Banker |
| #13 | BamBanker hRM |

FIG. 10

| Group | Group name | Formulation | dose | route/regimen | target cell | n |
|---|---|---|---|---|---|---|
| Gr-1 | control | | | | Nalm6-luc/iv | 5 |
| Gr-2 | Fresh, 1e7 | Fresh | 1e7 | iv/1shot | Nalm6-luc/iv | 5 |
| Gr-3 | Primary CART, 5e6 | CS10, cryo | 5e6 | iv/1shot | Nalm6-luc/iv | 5 |
| Gr-4 | Formulation#1, 2e7 | 80%HS+10%EM+10%DMSO w/ Cytokine | 2e7 | iv/1shot | Nalm6-luc/iv | 5 |
| Gr-5 | Formulation#1, 3e7 | 80%HS+10%EM+10%DMSO w/ Cytokine | 3e7 | iv/1shot | Nalm6-luc/iv | 5 |
| Gr-6 | Formulation#2, 2e7 | 80%HS+10%EM+10%DMSO w/o Cytokine | 2e7 | iv/1shot | Nalm6-luc/iv | 5 → 4 |
| Gr-7 | Formulation#3, 2e7 | CS10:EM (HS)=1:1 w/ Cytokine | 2e7 | iv/1shot | Nalm6-luc/iv | 5 |
| Gr-8 | Formulation#3, 3e7 | CS10:EM (HS)=1:1 w/ Cytokine | 3e7 | iv/1shot | Nalm6-luc/iv | 5 |
| Gr-9 | Formulation#4, 2e7 | CS10:EM (Albuminar)=1:1 w/o Cytokine | 2e7 | iv/1shot | Nalm6-luc/iv | 5 |
| Gr-10 | Formulation#4, 3e7 | CS10:EM (Albuminar)=1:1 w/o Cytokine | 3e7 | iv/1shot | Nalm6-luc/iv | 5 |

FIG. 11A-1

| Group | Group name | Formulation | dose | route/regimen | target cell | n |
|---|---|---|---|---|---|---|
| Gr-11 | Formulation#5, 2e7 | CS10:EM (HS)=1:1 w/o Cytokine | 2e7 | iv/1shot | Nalm6-luc/iv | 5 |
| Gr-12 | Formulation#6, 2e7 | CS10:WB=2:1 | 2e7 | iv/1shot | Nalm6-luc/iv | 5 |
| Gr-13 | Formulation#6, 3e7 | CS10:WB=2:1 | 3e7 | iv/1shot | Nalm6-luc/iv | 5 |
| Gr-14 | Formulation#7, 2e7 | CS10:WB=1:1 | 2e7 | iv/1shot | Nalm6-luc/iv | 5 |
| Gr-15 | Formulation#8, 2e7 | StemCell Banker:WB= 2:1 | 2e7 | iv/1shot | Nalm6-luc/iv | 5 |
| Gr-16 | Formulation#9, 2e7 | BamBanker hRM:WB=2:1 | 2e7 | iv/1shot | Nalm6-luc/iv | 5 |
| Gr-17 | Formulation#10, 2e7 | CS10:HS=1:1 w/ Cytokine | 2e7 | iv/1shot | Nalm6-luc/iv | 5 |
| Gr-18 | Formulation#11, 2e7 | CS10:HS=1:1 w/o Cytokine | 2e7 | iv/1shot | Nalm6-luc/iv | 5 |
| Gr-19 | Formulation#12, 2e7 | StemCellBanker | 2e7 | iv/1shot | Nalm6-luc/iv | 5 |
| Gr-20 | Formulation#13, 2e7 | BamBanker hRM | 2e7 | iv/1shot | Nalm6-luc/iv | 5 |

FIG. 11A-2

Experimental design to evaluate the *in vivo* efficacy of iCART cells cryopreserved using different cryo-formulations

COMPOSITIONS AND METHODS OF CRYOPRESERVING CELLS

CROSS REFERENCE TO RELATED APPLICATIONS

This application claims priority to U.S. Provisional Application Ser. No. 62/964,074, filed Jan. 21, 2020, the disclosure of which is hereby incorporated by reference.

BACKGROUND

Freezing of cells has long been used to preserve living cells after the cells have been removed or separated from a donating organism. However, the cryopreservation and recovery of living cells remains challenging. This is at least because cells subjected to freezing and thawing conditions are exposed to harsh conditions which in turn result in a generally low survivability rate.

Freezing is destructive to most living cells. Generally, as the extracellular medium freezes, cells attempt to maintain osmotic equilibrium across the membrane leading to intracellular water loss, which in turn increases intracellular solute concentration until intracellular freezing occurs. It is believed that both intracellular freezing and solution effects are responsible for cell injuries. Such cell injuries include, for example damage to cells plasma membrane which results from osmotic dehydration of the cells.

SUMMARY

The inventors have surprisingly discovered cryopreservation media that allows for freezing and subsequent thawing of viable cells. The frozen and thawed cells using the media and methods described herein retain high survivability, allowing the cells to be used for various applications, including for example, adoptive cell transfer methods.

In some aspects, a cryopreservation medium for cryopreserving, mammalian cells is provided, the medium comprising: dimethyl sulfoxide (DMSO), disaccharide, human serum, and IL-7 or IL-15.

In some aspects, a cryopreservation medium for cryopreserving mammalian cells is provided, the medium comprising: dimethyl sulfoxide (DMSO), disaccharide, human serum albumin, and IL-7 or IL-15.

In some embodiments, the cryopreservation medium includes IL-7 and IL-15.

In some aspects, a cryopreservation medium for cryopreserving, mammalian cells is provided, the medium comprising: between about 1 w/v % and 10 w/v % dimethyl sulfoxide (DMSO), between about 0.25 w/v % and 5 w/v % disaccharide, and between about 10 w/v % and 90 w/v % human serum.

In some aspects, a cryopreservation medium for cryopreserving mammalian cells is provided, the medium comprising: between about 1 w/v % and 10 w/v % dimethyl sulfoxide (DMSO), between about 0.25 w/v % and 5 w/v % disaccharide, and between about 0.5 w/v % and 30 w/v % human serum albumin.

In some embodiments, the disaccharide is sucrose.

In some embodiments, the medium further comprises D-glucose.

In some embodiments, the cryopreservation medium includes one or more cytokines. In some embodiments, the cytokines are selected from IL-7 and IL-15.

In some embodiments, the cryopreservation medium includes both IL-7 and IL-15.

In some embodiments, IL-7 is present at a final concentration of between about 1 ng/mL and 50 ng/mL.

In some embodiments, IL-7 is present at a final concentration of about 5 ng/mL.

In some embodiments, IL-15 is present at a final concentration of between about 1 ng/mL and 50 ng/mL.

In some embodiments, the IL-15 is present at a final concentration of about 5 ng/mL.

In some embodiments, the cryopreservation medium further includes a mammalian cell culture medium. In some embodiments, the mammalian cell culture medium is present at about between 10 w/v % and 90 w/v %. In some embodiments, the mammalian cell culture medium does not comprise non-human animal components.

In some embodiments, the cryopreservation medium further includes one or more amino acids.

In some embodiments, the cryopreservation medium further includes one or more inorganic salts.

In some embodiments, the pH between about 7 and 8. For example, the pH is about 7.2, 7.3, 7.4, 7.5, 7.6 7.7 and 7.8. In some embodiments, the pH is about 7.4.

In some embodiments, a kit is provided that includes the cryopreservation medium described herein.

In some aspects, a method of cryopreserving mammalian cells is provided the method includes: (a) contacting the cells with a cryopreservation medium described herein; and (b) cooling the cells by about 1° C./minute to a temperature of −80° C. or below.

In some aspects, a method of cryopreserving and recovering viable cells is provided, the method comprising: (a) contacting the cells with a cryopreservation medium described herein; (b) cooling the cells by about 1° C./minute to a temperature of −80° C. or below thereby cryopreserving the cells; and (c) thawing the cryopreserved cells.

In some embodiments, the thawed cryopreserved cells are not washed prior to subsequent culture or transplantation into a subject.

In some embodiments, the thawed cryopreserved cells have enhanced cell survival in comparison to cells frozen and thawed with a cryopreservation medium not disclosed herein. For example, the thawed cryopreserved cells have enhanced cell survival in comparison to cells frozen and thawed with a generally commercially available cryopreservation medium.

In some embodiments, the thawed cryopreserved cells have enhanced cell survival in vitro.

In some embodiments, the thawed cryopreserved cells have enhanced cell survival following transplantation into a subject.

In some embodiments, the mammalian cells are lymphocytes or progenitor cells.

In some embodiment mammalian cells are genetically modified lymphocytes or progenitor cells.

In some embodiments, the mammalian cells are induced pluripotent cell (iPSC)-derived lymphocytes or progenitor cells.

In some embodiments, the lymphocytes are T cells or natural killer (NK) cells.

In some embodiments, the progenitor cells are iPSC, hematopoietic progenitor cells (HPC), or embryonic stem cells (ESC).

In some embodiments, the mammalian cells are suitable for adoptive cell therapy.

Various aspects of the invention are described in detail in the following sections. The use of sections is not meant to limit the invention. Each section can apply to any aspect of the invention. In this application, the use of "or" means "and/or" unless stated otherwise. As used herein, the singular forms "a", "an", and "the" include both singular and plural referents unless the context clearly dictates otherwise.

BRIEF DESCRIPTION OF THE DRAWINGS

FIG. 1 illustrates an experimental design that includes different cryo-formulation numbers and their compositions, number of mice each formulation was tested on, and iCART cell activation and transduction days of cells.

FIG. 3A illustrates an experimental design to test the in vivo efficacy of iCART cells that were cryopreserved using cryo-formulation #2, cryo-formulation #6, and cryo-formulation #10. The design includes formulation compositions, number of mice each formulations were tested on, dose/s of cells administered to mice, and activation/collection days of cells.

FIG. 4 illustrates an experimental design to test the effect of low- and high-washing of cryo-formulations on the in vivo efficacy of wild-type iCART cells. The design include three different formulations, doses of WART cells, number of mice each formulations were tested on, and routes of administrations of target cells (i.e., Nalm6 cells) and iCART cells.

FIG. 7A illustrates five different formulations/conditions that were used to prepare cryostock iCART cells. FIG. 7B illustrates an experimental design to test the in vivo efficacy of fresh iCART cells vs. cryostock iCART cells. The design include five different formulations, doses of iCART cells, frozen stock termculture and expansion of cryostocks, and number of mice each formulations were tested on.

FIG. 10 illustrates thirteen different cryo-formulations with and without cytokines.

FIGS. 11A1, FIG. 11A2, and 11B illustrate an experimental design to evaluate the in vivo efficacy of iCART cells that were cryopreserved using formulations illustrated in FIG. 10.

DEFINITIONS

Figure 2:
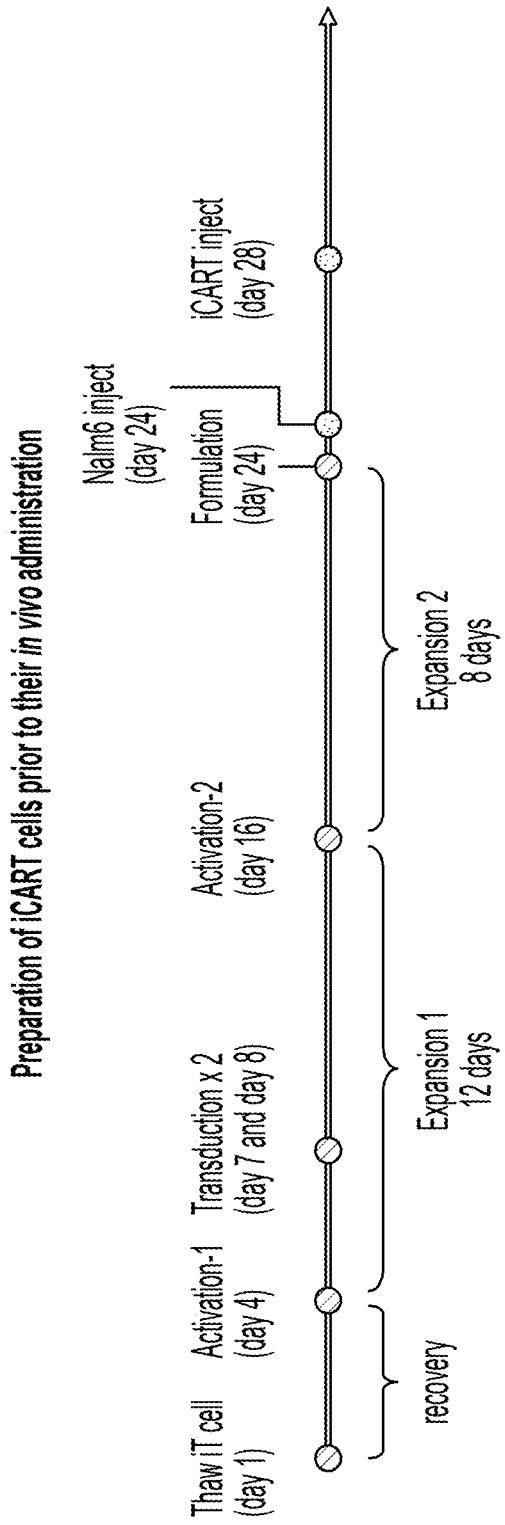
FIG. 2 is a schematic illustration of preparation of iCART cells from frozen iPSC-derived T cells ("iT cells").

Administering: As used herein, the terms "administering," or "introducing" are used interchangeably in the context of delivering a once-frozen cell of interest to a patient in need thereof. Various methods are known in the art for administering cells to patients vectors, including for example administering the cells to a patient in need by intravenous or surgical methods.

Adoptive Cell Therapy: As used herein, the term "adoptive cell transfer" or "ACT" refers to the transfer of cells into a patient in need thereof. The cells can be derived and propagated from the patient in need or could have been obtained from a non-patient donor. In some embodiments, the cell is an immune cell, such as a lymphocyte. Various cell types can be used for ACT such as a T-cells, CD8+ cells, CD4+ cells, NK-cells, delta-gamma T-cells, regulatory T-cells and peripheral blood mononuclear cells. Furthermore, the cells that have been cryopreserved using the composition and/or methods described herein can further be genetically modified and retain high viability and suitability for ACT applications. For example, in some embodiments, the frozen cells can be genetically modified to introduce a chimeric antigen receptor (CAR). Alternatively, in some embodiments, a cell that has already been previously genetically modified (e.g., a CAR-T cell) can be cryopreserved using the cryopreservation medium and/or methods described herein and retain high survivability and suitability for ACT applications.

Animal: As used herein, the term "animal" refers to any member of the animal kingdom. In some embodiments, "animal" refers to humans, at any stage of development. In some embodiments. "animal" refers to non-human animals, at any stage of development. In certain embodiments, the non-human animal is a mammal (e.g., a rodent, a mouse, a rat, a rabbit, a monkey, a dog, a cat, a sheep, cattle, a primate, and/or a pig). In some embodiments, animals include, but are not limited to, mammals, birds, reptiles, amphibians, fish, insects, and/or worms. In some embodiments, an animal may be a transgenic animal, genetically-engineered animal, and/or a clone.

Approximately or about: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4?, 3%, 2%, 1%, or less in either direction (greater than or less than) of the stated reference value unless otherwise stated or otherwise evident from the context (except where such number would exceed 100% of a possible value).

Cryopreservation: As used herein, the term "cryopreservation" or "freezing" generally refers to a method in which cells are frozen to maintain cellular viability. Cryopreserved cells maintain viability for an extended period of time in the frozen state, such as for 1, 5, 10 or more years in the cryopreserved state. The cryopreserved cells, once thawed, are able to propagate both for in vitro and in vivo applications.

Fresh cell: As used herein, the term "fresh" or "fresh cell," refers to mammalian cells that have never been froze.

Functional equivalent or derivative: As used herein, the term "functional equivalent" or "functional derivative" denotes, in the context of a functional derivative of an amino acid sequence, a molecule that retains a biological activity (either function or structural) that is substantially similar to that of the original sequence. A functional derivative or equivalent may be a natural derivative or is, prepared synthetically. Exemplary functional derivatives include amino acid sequences having substitutions, deletions, or additions of one or more amino acids, provided that the biological activity of the protein is conserved. The substituting amino acid desirably has chemico-physical properties which are similar to that of the substituted amino acid. Desirable similar chemico-physical properties include, similarities in charge, bulkiness, hydrophobicity, hydrophilicity, and the like.

In vitro: As used herein, the term "in vitro" refers to events that occur in an artificial environment, e.g., in a test tube or reaction vessel, in cell culture, etc., rather than within a multi-cellular organism.

In vivo: As used herein, the term "in vivo" refers to events that occur within a multi-cellular organism, such as a human and a non-human animal. In the context of cell-based systems, the term may be used to refer to events that occur within a living cell (as opposed to, for example, in vitro systems).

Primary Cell: The term. "primary cell," refers to cells that are directly isolated from a subject and which are subsequently propagated.

Polypeptide: The term, "polypeptide," as used herein refers a sequential chain of amino acids linked together via peptide bonds. The term is used to refer to an amino acid chain of any length, but one of ordinary skill in the art will understand that the term is not limited to lengthy chains and can refer to a minimal chain comprising two amino acids linked together via a peptide bond. As is known to those skilled in the art, polypeptides may be processed and/or modified.

Protein: The term "protein" as used herein refers to one or more polypeptides that function as a discrete unit. If a single polypeptide is the discrete functioning unit and does not require permanent or temporary physical association with other polypeptides in order to form the discrete functioning unit, the terms "polypeptide" and "protein" may be used interchangeably. If the discrete functional unit is comprised of more than one polypeptide that physically associate with one another, the term "protein" refers to the multiple polypeptides that are physically coupled and function together as the discrete unit.

Subject: As used herein, the term "subject" refers to a human or any non-human animal (e.g., mouse, rat, rabbit, dog, cat, cattle, swine, sheep, horse or primate). A human includes pre- and post-natal forms. In many embodiments, a subject is a human being. A subject can be a patient, which refers to a human presenting to a medical provider for diagnosis or treatment of a disease. The term "subject" is used herein interchangeably with "individual" or "patient." A subject can be afflicted with or is susceptible to a disease or disorder but may or may not display symptoms of the disease or disorder.

Substantially: As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Suffering from: An individual who is "suffering from" a disease, disorder, and/or condition has been diagnosed with or displays one or more symptoms of the disease, disorder, and/or condition.

Therapeutically effective amount: As used herein, the term "therapeutically effective amount" of a therapeutic agent means an amount that is sufficient, when administered to a subject suffering from or susceptible to a disease, disorder, and/or condition, to treat, diagnose, prevent, and/or delay the onset of the symptom(s) of the disease, disorder, and/or condition. It will be appreciated by those of ordinary skill in the art that a therapeutically effective amount is typically administered via a dosing regimen comprising at least one unit dose.

Treating: As used herein, the term "treat," "treatment," or "treating" refers to any method used to partially or completely alleviate, ameliorate, relieve, inhibit, prevent, delay onset of, reduce severity of and/or reduce incidence of one or more symptoms or features of a particular disease, disorder, and/or condition. Treatment may be administered to a subject who does not exhibit signs of a disease and/or exhibits only early signs of the disease for the purpose of decreasing the risk of developing pathology associated with the disease.

The recitation of numerical ranges by endpoints herein includes all numbers and fractions subsumed within that range (e.g. 1 to 5 includes 1, 1.5, 2, 2.75, 3, 3.9, 4 and 5). It is also to be understood that all numbers and fractions thereof are presumed to be modified by the term "about."

Various aspects of the invention are described in detail in the following sections. The use of sections is not meant to limit the invention. Each section can apply to any aspect of the invention. In this application, the use of "or" means "and/or" unless stated otherwise. As used herein, the singular forms "a", "an", and "the" include both singular and plural referents unless the context clearly dictates otherwise.

DETAILED DESCRIPTION

Compositions for Cryopreservation of Cells

Provided herein are various cryopreservation media suitable for cryopreserving and subsequent thawing of viable mammalian cells.

In some aspects, a suitable cryopreservation medium for cryopreserving and subsequent thawing of viable cells comprises: dimethyl sulfoxide (DMSO), a disaccharide, a cytokine. A suitable cryopreservation medium also comprises human serum albumin or human serum.

Suitable cytokines that can be used in the cryopreservation medium include, for example, IL-7 and IL-15. Accordingly, in some embodiments, the cryopreservation medium includes 11.7. In some embodiments, the cryopreservation medium includes IL-15. In some embodiments, the cryopreservation medium includes both IL-7 and IL-15. In some embodiments, one or more additional cytokines are added to the cryopreservation medium.

Various concentration of cytokines can be used in the cryopreservation medium. For example, in some embodiments, IL-7 is present in the cryopreservation medium at a final concentration of between about 1 ng/mL and 50 ng/mL. Accordingly, in some embodiments, IL-7 is present in the cryopreservation medium at a final concentration of between 1.0 w/v %, 1.5 w/v %, 2.0 w/v %, 2.5 w/v %, 3.0 w/v %, 3.5 w/v %, 4.0 w/v %, 4.5 w/v %, 5.0 w/v %, 5.5 w/v %, 6.0 w/v %, 6.5 w/v %, 7.0 w/v %, 7.5 w/v %, 8.0 w/v %, 8.5 w/v %, 9.0 w/v %, 9.5 w/v %, 10.0 w/v %, 10.5 w/v %, 11.0 w/v %, 11.5 w/v %, 12.0 w/v %, 12.5 w/v %, 13.0 w/v %, 13.5 w/v %, 14.0 w/v %, 14.5 w/v %, 15.0 w/v %, 15.5 w/v %, 16.0 w/v %, 16.5 w/v %, 17.0 w/v %, 17.5 w/v %, 18.0 w/v %, 18.5 w/v %, 19.0 w/v %, 19.5 w/v %, 20.0 w/v %, 20.5 w/v %, 21.0 w/v %, 21.5 w/v %, 22.0 w/v %, 22.5 w/v %, 23.0 w/v %, 23.5 w/v %, 24.0 w/v %, 24.5 w/v %, 25.0 w/v %, 25.5 w/v %, 26.0 w/v %, 26.5 w/v %, 27.0 w/v %, 27.5 w/v %, 28.0 w/v %, 28.5 w/v %, 29.0 w/v %, 29.5 w/v %, 30.0 w/v %, 30.5 w/v %, 31.0 w/v %, 31.5 w/v %, 32.0 w/v %, 32.5 w/v %, 33.0 w/v %, 33.5 w/v %, 34.0 w/v %, 34.5 w/v %, 35.0 w/v %, 35.5 w/v %, 36.0 w/v %, 36.5 w/v %, 37.0 w/v %, 37.5 w/v %, 38.0 w/v %, 38.5 w/v %, 39.0 w/v %, 39.5 w/v %, 40.0 w/v %, 40.5 w/v %, 41.0 w/v %, 41.5 w/v %, 42.0 w/v %, 42.5 w/v %, 43.0 w/v %, 43.5 w/v %, 44.0 w/v %, 44.5 w/v %, 45.0 w/v %, 45.5 w/v %, 46.0 w/v %, 46.5 w/v %, 47.0 w/v %, 47.5 w/v %, 48.0 w/v %, 48.5 w/v %, 49.0 w/v %, 49.5 w/v %, 50 w/v %. In some embodiments, IL-7 is present in the cryopreservation medium at a final concentration of about 5.0 w/v %. In some embodiments, IL-15 is present in the cryopreservation medium at a final concentration of between about 1 ng/mL and 50 ng/mL. Accordingly, in some embodiments, IL-15 is present in the cryopreservation medium at a final concentration of between about 1.0 w/v %, 1.5 w/v %, 2.0 w/v %, 2.5 w/v %, 3.0 w/v %, 3.5 w/v %, 4.0 w/v %, 4.5 w/v %, 5.0 w/v %, 5.5 w/v %, 6.0 w/v %, 6.5 w/v %, 7.0 w/v %, 7.5 w/v %, 8.0 w/v %, 8.5 w/v %, 9.0 w/v %, 9.5 w/v %, 10 w/v %, 10.0 w/v %, 10.5 w/v %, 11 w/v %, 11.5 w/v %, 12.0 w/v %, 12.5 w/v %, 13.0 w/v %, 13.5 w/v %, 14.0 w/v %, 14.5 w/v %, 15.0 w/v %, 15.5 w/v %, 16.0 w/v %, 16.5 w/v %, 17.0 w/v %, 17.5 w/v %, 1.8 w/v %, 18.5 w/v %, 19.0 w/v %, 19.5 w/v %, 20.0 w/v %, 20.5 w/v %, 21.0 w/v %, 21.5 w/v %, 22.0 w/v %, 22.5 w/v %, 23.0 w/v %, 23.5 w/v %, 24.0 w/v %, 24.5 w/v %, 25.0 w/v %, 25.5 w/v %, 26.0 w/v %, 7.6.5 w/v %, 27.0 w/v %, 27.5 w/v %, 28.0 w/v %, 28.5 w/v %, 29.0 w/v %, 9.5 w/v %, 30.0 w/v %, 30.5 w/v %, 31.0 w/v %, 31.5 w/v %, 32.0 w/v %, 32.5 w/v %, 33.0 w/v %, 33.5 w/v %, 34.0 w/v %, 34.5 w/v %, 35.0 w/v %, 35.5 w/v %, 36.0 w/v %, 36.5 w/v %, 37.0 w/v %, 37.5 w/v %, 38.0 w/v %, 38.5 w/v %, 39.0 w/v %, 39.5 w/v %, 40.0 w/v %, 40.5 w/v %, 41.0 w/v %, 41.5 w/v %, 42.0 w/v %, 42.5 w/v %, 43.0 w/v %, 43.5 w/v %, 44.0 w/v %, 44.5 w/v %, 45.0 w/v %, 45.5 w/v %, 46.0 w/v %, 46.5 w/v %, 47.0 w/v %, 47.5 w/v %, 48.0 w/v %, 48.5 w/v %, 49.0 w/v %, 49.5 w/v %, 50 w/v %. In some embodiments, IL-15 is present in the cryopreservation medium at a final concentration of about 5.0 w/v %. In some embodiments, both IL-7 and IL-15 are present in the cryopreservation medium. In some embodiments, IL-7 and IL-15 are present in the cryopreservation medium at a final concentration of about 5.0 w/v % each. In some embodiments, IL-7 and IL-15 are present in the cryopreservation medium at a final concentration of about 2.25 w/v % each.

In some embodiments, the cryopreservation medium comprises human serum. In some embodiment, the cryopreservation medium comprises human serum albumin. In some embodiments, the cryopreservation medium includes both human serum and human serum albumin.

Various concentrations of human serum can be used in the cryopreservation medium. In some embodiments, the cryopreservation medium includes between about 10 w/v % and 90 w/v % human serum. Accordingly, in some embodiments, the cryopreservation contains about 10 w/v %, 15 w/v %, 20 w/v %, 25 w/v %, 30 w/v %, 35 w/v %, 40 w/v %, 45 w/v %, 50 w/v %, 55 w/v %, 60 w/v %, 65 w/v %, 70 w/v %, 75 w/v %, 80 w/v %, 85 w/v %, or 90 w/v %, human serum.

Various concentration of human serum albumin can be used in the cryopreservation medium. In some embodiments, the cryopreservation medium includes between about 0.5 w/v % and 30 w/v % human serum albumin. Accordingly, in some embodiments, the cryopreservation medium includes between about 0.5 w/v %, 1.0 w/v %, 1.5 w/v %, 2.0 w/v %, 2.5 w/v %, 3.0 w/v %, 3.5 w/v %, 4.0 w/v %, 4.5 w/v %, 5.0 w/v %, 6.0 w/v %, 6.5 w/v %, 7.0 w/v %, 7.5 w/v %, 8.0 w/v %, 8.5 w/v %, 9.0 w/v %, 10.0 w/v %, 10.5 w/v %, 11.0 w/v %, 11.5 w/v %, 12.0 w/v %, 12.5 w/v %, 13.0 w/v %, 13.5 w/v %, 14.0 w/v %, 14.5 w/v %, 15.0 w/v %, 15.5 w/v %, 16.0 w/v %, 16.5 w/v %, 17.0 w/v %, 17.5 w/v %, 18.0 w/v %, 18.5 w/v %, 19.0 w/v %, 19.5 w/v %, 20.0 w/v %, 20.5 w/v %, 21.0 w/v %, 21.5 w/v %, 22.0 w/v %, 22.5 w/v %, 23.0 w/v %, 23.5 w/v %, 24.0 w/v %, 24.5 w/v %, 25.0 w/v %, 25.5 w/v %, 26.0 w/v %, 26.5 w/v %, 27.0 w/v %, 27.5 w/v %, 28.0 w/v %, 28.5 w/v %, 29.0 w/v %, 29.5 w/v %, or 30.0 w/v % human serum albumin.

Various concentrations of DMSO can be used in the cryopreservation medium. In some embodiments, the medium includes between about 1 and 10 w/v % DMSO. Accordingly, in some embodiments, the medium includes about 1.0 w/v %, 1.5 w/v %, 2.0 w/v %, 2.5 w/v %, 3.0 w/v %, 3.5 w/v %, 4.0 w/v %, 4.5 w/v %, 5.5 w/v %, 6.0 w/v %, 6.5 w/v %, 7.0 w/v %, 7.5 w/v %, 8.0 w/v %, 8.5 w/v %, 9.0 w/v %, 9.5 w/v %, or 10 w/v % DMSO. In some embodiments, the cryopreservation medium comprises about 5.0 w/v % DMSO.

In some embodiments, the cryopreservation medium includes at least one dissarcharide. For example, in some embodiments, the cryopreservation medium includes at least one of sucrose, lactose or maltose. In some embodiments, the cryopreservation medium comprises sucrose.

Various concentration of dissacharide can be used in the cryopreservation medium. For example, in some embodiments, the cryopreservation medium includes a dissacharide at a concentration of between about 0.25 w/v %, 0.5 w/v %, 0.75 w/v %, 1.0 w/v %, 1.25 w/v %, 1.5 w/v %, 1.75 w/v %, 2.0 w/v %, 2.25 w/v %, 2.75 w/v %, 3.0 w/v %, 3.25 w/v %, 3.5 w/v %, 3.75 w/v %, 4.0 w/v %, 4.75 w/v %, 4.5 w/v %, 4.75 w/v %, 5.0 w/v %, 5.5 w/v %, 6.0 w/v %, 6.5 w/v %, 7.0 w/v %, 7.5 w/v %, 8.0 w/v %, 8.5 w/v %, 9.0 w/v %, 9.5 w/v %, or 10 w/v %.

In some embodiments, the cryopreservation medium includes D-glucose.

In some embodiments, the cryopreservation medium further comprises a mammalian cell culture medium. Various mammalian cell culture media are known in the art. Generally, a typical cell culture medium includes a variety of amino acids, vitamins, glucose, inorganic salts and serum as a source of growth factors, hormones and attachment factors. The cell culture medium also helps regulate pH and osmolality. Any suitable mammalian cell culture medium can be used in the cryopreservation medium described herein. Examples of known mammalian cell culture medium include, for example, Iscove's Modified Dulbecco's Medium (MEM), Dulbecco's Modified Eagle Medium (DMEM), Minimal Essential Medium (MEM), Dulbecco's Modified Eagle Medium/Nutrient Mixture F-12 (DMEM/F-12). In some embodiments, the mammalian cell culture medium is IN/DIVE. In some embodiments, the mammalian cell culture medium does not comprise non-human animal components. In some embodiments, the mammalian cell culture medium comprises one or more of the following amino acids: Glycine, L-Alanine, L-Arginine hydrochloride, L-Asparagine (freebase), L-Aspartic acid, L-Cystine L-Glutamic Acid, L-Glutamine, L-Histidine hydrochloride-H2O, L-Isoleucine, L-Leucine, L-Lysine hydrochloride, L-Methionine, L-Phenylalanine, L-Proline, L-Serine, L-Threonine, L-Tryptophan, L-Tyrosine disodium salt, L-Valine. In some embodiments, the mammalian cell culture medium comprises one or more of the following vitamins: Biotin, Choline chloride, D-Calcium pantothenate, Folic Acid, Niacinamide, Pyridoxal hydrochloride, Riboflavin, Thiamine hydrochloride, Vitamin B12, i-Inositol. In some embodiments, the mammalian cell culture medium comprises one or more of the following inorganic salts: Calcium Chloride (CaCl2) (anhyd.), Magnesium Sulfate (MgSO4) (anhyd.), Potassium Chloride (KCl), Potassium Nitrate (KNO3), Sodium Bicarbonate (NaHCO3), Sodium Chloride (NaCl), Sodium Phosphate monobasic (NaH2PO4-H2O), Sodium Selenite (Na2SeO3-5H20). In some embodiments, the mammalian cell culture medium comprises one or more of the following: D-Glucose (Dextrose), HUES, Phenol Red, Sodium Pyruvate. In some embodiments, the mammalian cell culture medium comprises: Glycine 30.0 mg/L, L-Alanine 25.0 mg/L, L-Arginine hydrochloride 84.0 mg/L, L-Asparagine (freebase) 25.0 mg/L, L-Aspartic acid 30.0 mg/L, L-Cystine 2HCl 91.4 mg/L, L-Glutamic Acid 75.0 mg/L, L-Glutamine 584.0 mg/L, L-Histidine hydrochloride-H2O 42.0 mg/L L-Isoleucine 105.0 mg/L, L-Leucine 105.0 mg/L, L-Lysine hydrochloride 146.0 mg/L, L-Methionine 30.0 mg/L, L-Phenylalanine 66.0 mg/L, L-Proline 40.0 mg/L, L-Serine 42.0 mg/L, L-Threonine 95.0 mg/L, L-Tryptophan 16.0 mg/L, L-Tyrosine disodium salt 104.0 mg/L, L-Valine 94.0 mg/L, Biotin 0.013 mg/L, Choline chloride 4.0 mg/L, D-Calcium pantothenate 4.0 mg/L, Folic Acid 4.0 mg/L, Niacinamide 4.0 mg/L, Pyridoxal hydrochloride 4.0 mg/L, Riboflavin 0.4 mg/L, Thiamine hydrochloride 4.0 mg/L, Vitamin B12 0.013 mg/L, i-Inositol 7.2 mg/L, Calcium Chloride (CaCl2) (anhyd.) 165.0 mg/L, Magnesium Sulfate (MgSO4) (anhyd.) 97.67 mg/L, Potassium Chloride (KCl) 330.0 mg/L, Potassium Nitrate (KNO3) 0.076 mg/L, Sodium Bicarbonate (NaHCO3) 3024.0 mg/L, Sodium Chloride (NaCl) 4505.0 mg/L, Sodium Phosphate monobasic (NaH2PO4-H2O) 125.0 mg/L, Sodium Selenite (Na2SeO3-5H$_2$O) 0.017 mg/L, D-Glucose (Dextrose) 4500.0 mg/L, HEPES 5958.0 mg/L, Phenol Red 15.0 mg/L, Sodium Pyruvate 110.0 mg/L.

Various concentrations of the mammalian cell culture medium can be present in the cryopreservation medium and include for example concentrations of between about 10 w/v % and 90 w/v %. Accordingly, in some embodiments, the mammalian cell culture medium is present in the cryopreservation medium at about 10 w/v %, 15 w/v %, 20 w/v %, 25 w/v %, 30 w/v %, 35 w/v %, 40 w/v %, 45 w/v %, 50 w/v %, 55 w/v %, 60 w/v %, 65 w/v %, 70 w/v %, 75 w/v %, 80 w/v %, 8 w/v %, 5, or 90 w/v %.

In some embodiments, the cryopreservation medium has a pH of between about 7.3 and 7.5. Accordingly, in some embodiments, the cryopreservation medium has a pH of about 7.3, 7.35, 7.4, 7.45, or 7.5. In some embodiments, the cryopreservation medium has a pH of about 7.5.

Method of Cryopreservation of Cells

Cells that can be cryopreserved, in general, include any mammalian cell. In some embodiments, cells that can be cryopreserved include stem cells, other progenitor cells, red and white blood cells, sperm cells, oocytes, ova, and cellular materials derived from tissues and organs. Further examples of suitable cells include for example pancreatic islet cells, chondrocytes, cells of neural origin, cells of hepatic origin, cells of opthalmolic origin, cells of orthopedic origin, cells from connective tissues, cells of reproductive origin, and cells of cardiac origin. In some other embodiments, cells include the erythrocyte, neutrophilic, eosinophilic, and basophilic granulocytes, lymphocytes, and platelet cells. In some embodiments, lymphocyte includes B-lymphocytes, T-lymphocytes, non-B-lymphocytes, nonT-lymphocytes, induced pluripotent cell-derived lymphocytes, and genetically modified lymphocytes. The lymphocytes further includes T cells or natural killer (NK) cells. The progenitor cells include embryonic stem cells (ESC), hematopoietic progenitor cells (HPC), or induced pluripotent cells (iPSC).

In some embodiments, cryopreservation of cells includes the steps of (i) introducing the target cells into a diluted cryopreservation solution (cryo-formulation or cryopreservation medium), (ii) freezing or cryopreserving the protected target cells, (iii) thawing the frozen solution to ambient conditions, and (iv) introducing the thawed target cells into a subject in need of such target cells.

In some embodiments, the cryopreservation solution is maintained at room temperature prior to use and the blended target cells are held at room temperature for as long as thirty minutes before freezing is commenced without an appreciable loss in cell viability. In some other embodiments, the cryopreservation solution is cooled to about 4° C. prior to the addition of target cells in order to expedite the freezing process, and requires that the freezing process commence immediately after the cryo-preservation solution is added to the cells in order to minimize cell death induced by the presence of solution.

In some embodiments, the volume of diluted cryopreservation solution which are added to the target cells depends upon both the volumetric ratio of target cell containing solution to cryopreservation solution and the ratio of target cells to cryopreservation solution. In some embodiments, the volumetric ratio of target cell containing solution to cryopreservation solution should generally be between about 1:1 to 1:10 with the ratio of target cells to cryopreservation solution between about $1\times10^5$ cells/ml to about $1\times10^9$ cells/ml. In some embodiments, the ratio of target cells to cryopreservation solution includes between about $1\times10^8$ cells/ml to $3\times10^8$ cells/ml. Ratios of greater than those set forth above may result in a decrease in the concentration of viable cells due to insufficient cryopreservation solution, while ratios less than those set forth above simply may result in an inefficient use of the cryopreservation solution and the need to introduce excessive cryopreservation solution into a subject in order to introduce effective amounts of the target cells. Target cells are often available for preservation only in dilute form as a constituent in a biological fluid (e.g., stem cells concentrated from peripheral blood commonly contain stem cells at a concentration of about $1\times10^6$ cells/ml to about $3\times10^8$ cells/ml with the balance comprising other blood components such as plasma and platelets). These biologically diluted samples can generally be combined with the cryopreservation solution at a volumetric ratio of about 2:1 to 1:4 (depending of course upon a number of factors including the specific formulation of the diluted cryopreservation solution, the concentration of target cells in the biologically diluted sample, the type of target cells, etc.) to achieve the optimum ratio of target cells to cryopreservation solution. In some embodiments, the final target cell containing solution generally contains about 4 to 12 wt % glycerol and about 2 to 10 wt % albumin, with variations outside of this general range contemplated for certain applications.

In some embodiments, target cells are suspended in the cryopreservation solution to prepare a cell suspension, the suspension thus prepared is dispensed into freezing tubes, and the resulting tubes are placed directly in an ultra-low temperature freezer at −80° C. to freeze the cells. In some other embodiments, the freezing tubes can be placed in a programmed freezer to slowly freeze the cells. The preservation of the frozen cells can be carried out by maintaining the cells at the temperature used for freezing (for example, −80° C.). For optimal freezing, to achieve cell viabilities on thawing above 80-90%, one can use slow freezing methods. There are multiple forms of computerized freezing chambers that reduce the temperature a degree at a time until it reaches −80° C.; they often include a computerized strategy of having the cells linger for somewhat longer at a temperature at which ice begins to form to minimize ice crystal damage to the cells. In some embodiments, slow programmable freezing includes lowering the initial temperature at a rate of about 1° C. per minute until a final temperature is reached. Accordingly, in some embodiments, the slow freezing occurs at a rate of about 0.25° C., 0.5° C., 0.75° C., 1.0° C., 1.25° C., 1.5° C., 1.75° C., 2.0° C., 2.25° C., 2.5° C., 2.75° C. or 3 C per minute. In some embodiments, slow freezing includes: (a) cooling cells from an initial temperature to a final temperature of about −80° C. using solid carbon dioxide, or (b) cooling cells from an initial temperature to a final temperature of about −196° C. using liquid nitrogen.

In some embodiments, the thawed cells using the medium and/or methods described herein have a viability of at least about 70%, 75%, 80%, 85%, 90%, 95%, 99% or more.

A controlled slow cooling rate can often be effective for achieving optimal cell viability. It is generally believed that different cell types have different optimal cooling rates (See, e.g. Rowe, A. W. and Rinfret, A. P., 1962, Blood 20:636; Ro W., 1966, Cryo Biology 3(1):12-18; Lewis, J. P., et al., 1967, transfusion 7(1):17-32; and Mazur, P., 1970 Science 168: 939-949 for effects of cooling velocity on survival of marrow-stem cells and on their transplantation potential).

In some embodiments, the container holding the cells is stable at cryogenic temperatures and allow for rapid heat transfer for effective control of both freezing and thawing. Sealed plastic vials (e.g., Nunc and Wheaton cryules) or glass ampules can be used for multiple small amounts (1 to 2 ml), while larger volumes of 100 to 200 ml can be frozen in polyolefin bags, such as those available from Fenwal, held between metal plates.

In some embodiments, the frozen cells are then transferred to a long-term cryogenic storage vessel. In some embodiments, samples are cryogenically stored in liquid nitrogen (−196° C.) or liquid nitrogen vapor (−105° C.). Such storage is greatly facilitated by the availability of highly efficient liquid nitrogen refrigerators.

When the cells are needed, the frozen cells and the composition are subjected to a thawing process, after which the cells can be recovered. Further, a method for thawing the cells is also not particularly limited; for example, the cells can be thawed by placing the cryopreserved freezing tubes in a water bath at 37° C. Other non-limiting examples of suitable thawing include: (i) thawing cells cryopreserved; (ii) adding a first buffer solution; (iii) separating the cells from the cryopreservation medium and the first buffer solution; and (iv) resuspending the cells in a second buffer solution. In some embodiments, the thawed cells are not washed or rinsed of the cryogenic solution prior to use for in vitro or in vivo applications.

In some embodiments, the first and/or second buffer solution comprise serum or a serum replacement medium. In some embodiments, the serum is human serum or non-human animal-derived serum such as fetal bovine serum (TBS). In some embodiments, the serum replacement medium is one or more of GIBCO's Knockout Serum Replacement Medium and Kubota's medium, optionally supplemented with albumin, which in turn is optionally human serum derived albumin. In some embodiments, the serum is at a concentration of between about 2% to 20%, optionally between about 10% to 20%, about 10%, or about 20%. It is appreciated that this "high serum" thawing method may be advantageous to minimize ice crystal formation where a non-isotonic buffer is used because of the need for high lipid content in this process. In some embodiments, the serum is at a concentration of between about 2% to 5%. It is appreciated that this "low serum" thawing method may be used where an isotonic buffer is used because high lipid content is not required. In some embodiments, the serum replacement medium comprises albumin at a concentration of between about 1% to 5%.

In some embodiments, the first and/or second buffer solution comprise thawing buffer. It is appreciated that some commercially available thawing buffers comprise serum or serum replacement. It is also appreciated that some embodiments may include thawing through means other than those prescribed herein above.

It is further appreciated that multiple ways exist to separate cells from supernatant, e.g. culture medium, buffer solution, and/or cryopreservation solution. Non-limiting examples include centrifuging the cells; filtration of the cells through a sieve or filter; and French-press type filtration.

In one embodiment, the cryopreserved cells is first washed with ix cold medium followed by one time washing with cold DPBS, and then resuspending the cells in cold. DPBS prior to injecting the cells into the subject. The low dose (washed) means 1.5E7 CAR positive cells per dose, and high dose (washed) means 4.0E7 CAR positive cells per dose.

In some embodiments, thanks to the physiological compatibility of the cryopreservation solution, the thawed target cells is introduced into the subject without separating the target cells and the cryopreservation solution. Thus, in some embodiments, the thawed cells are not washed prior to use. The thawed target cells and accompanying cryopreservation solution is preferably warmed to body temperature (i.e., about 37° C.) prior to introduction into the subject. In such situation, the dose of the cells is based on the pre-freeze cell count.

In some embodiments, the thawed target cells is maintained for several hours at room temperature without an appreciable loss in cell viability. In some embodiments, the thawed solution is slowly diluted with saline or other appropriate ionic solution to so as to reduce the osmolality of the solution from the desired cryopreservation range of 500 to 2,000 mOsm/kg down to the physiological range of 260 to 320 mOsm/kg so as to reduce shock to the cell walls caused by sudden changes in osmolality.

In some embodiments, thawed cells are further cultured. In some embodiments, culturing involves placing the cells in an incubator; removing the buffer solution; and replacing the buffer solution with a culture medium designed for the growth and/or differentiation of cells. In some embodiments, the cells are incubated in the incubator for between about 6 to 7 hours. In some embodiments, the culture medium designed for the growth and/or differentiation of cells comprises Kubota's medium and/or a hormonally defined medium (HDM) for the differentiation of cells.

Viability of thawed cells can be assessed in vitro as well as in vivo. In some embodiments, the in vitro cell viability tests includes the Trypan Blue exclusion assay. In some embodiments, other analytical methods can be used to assess the cell viability of thawed cells that had been frozen with the different cryopreservation solutions, for example, gene expression, through the use of RT-OCR and the like. A person of ordinary skill in the art can opt for any analytical method to assess the viability of thawed cells that can be applied to assess the cell viability of otherwise fresh cells.

Viability of cells in vivo, in general, can be assessed by evaluating the functional characteristics of administered cells in vivo. In some embodiments, the in vivo viability of cells can be assessed by evaluating the cell number of the cells that have been introduced into a subject in need. Various methods are known in the art for tracing cells and determining viability of administered cells.

Kits

The present invention provides any of the compositions described herein in kits, optionally including instructions for use of the compositions (e.g., for preserving lymphocytes or progenitor and/or other cells). That is, the kit can include a description of use of a composition in any method described herein. A "kit," as used herein, typically defines a package, assembly, or container (such as an insulated container) including one or more of the components of the invention, and/or other components associated with the invention, for example, as previously described. In some embodiments, each of the components of the kit is provided in liquid form (e.g., in solution), or in solid form (e.g., a dried powder, frozen, etc.).

In some embodiments, the kit includes one or more components, which may be within the same or in two or more receptacles, and/or in any combination thereof. The receptacle is able to contain a liquid, and non-limiting examples include bottles, vials, jars, tubes, flasks, beakers, or the like. In some embodiments, the receptacle is spill-proof (when closed, liquid cannot exit the receptacle, regardless of orientation of the receptacle).

In some embodiments, a kit comprises the components of the cryopreservation medium, either packaged separately or together. In some embodiments, the kit is shipped at room temperature (about 25° C.), chilled (e.g., at about 4° C.), and/or any one or more of the components is shipped frozen (e.g., between 20° C. and 80° C., at about 150° C., etc.) or in liquid nitrogen (about 196° C.). In some cases, one or more of the components are frozen and/or shipped on dry ice (about 80° C.).

With regard to cryopreservation solutions, if more than one component is present (e.g., as described above), the components, in some embodiments, are frozen together in one common liquid (e.g., within one common receptacle), or as two or more separate liquids (e.g., within separate receptacles).

In some embodiments, some of the components are processable (e.g., to an active form), for example, by the addition of a suitable solvent or other species, which may or may not be provided with the kit. For example, the component may be heated or a liquid may be added to the component (e.g., if the component is frozen, lyophilized, shipped in a concentrated form, etc.).

In some cases, the kit will include a cryogenic vessel which is a vessel suitable for containing materials at cryogenic temperatures, for example, liquid nitrogen. Those of ordinary skill in the art will be aware of suitable cryogenic vessels, for example, a Dewar flask (e.g., formed from stainless steel and/or aluminum, etc.), a vapor shipper, a stainless steel container, a Styrofoam container, or the like. Typically, cryogenic temperatures include temperatures below about −150° C., below about −170° C., or below about −190° C. For instance, liquid nitrogen has a boiling point of about −196° C.

In some embodiments, the kit contains a receptacle for holding cells. For example, the receptacle may be constructed so that it can withstand cryogenic temperatures without rupture or fracture. In some embodiments, the receptacle is placed within a cryogenic vessel (e.g., using a float (for example, that can float on liquid nitrogen or other cryogenic liquid within the cryogenic vessel)). Non-limiting examples of receptacles for cells include cell straws, glass ampoules, cryotubes, cryovials, etc. The receptacle may be pre-labeled in certain instances.

Examples of other compositions or components associated with the invention include, but are not limited to, diluents, salts, buffers, chelating agents, preservatives, drying agents, antimicrobials, needles, syringes, packaging materials, tubes, bottles, flasks, beakers, and the like, for example, for using, modifying, assembling, storing, packaging, preparing, mixing, diluting, and/or preserving the components for a particular use. In embodiments where liquid forms of any of the components are used, the liquid form is concentrated or ready to use.

A kit of the invention generally includes instructions or instructions to a website or other source in any form that are provided for using the kit in connection with the components and/or methods of the invention. For instance, the instructions may include instructions for the use, modification, mixing, diluting, preserving, assembly, storage, packaging, and/or preparation of the components and/or other components associated with the kit. In some cases, the instructions also include instructions for the delivery of the components, for example, for shipping at room temperature, sub-zero temperatures, cryogenic temperatures, etc. The instructions are provided in any form that is useful to the user of the kit, such as written or oral (e.g., telephonic), digital, optical, visual (e.g., videotape, DVD, etc.) and/or electronic communications (including Internet or web-based communications), provided in any manner.

Uses of Cryopreserved Cells

The cryopreserved and thawed cells using the cryopreservation media described herein allows for using the cells for any purpose that a primary cell or fresh cell isolate can have. The cryopreserved and thawed cells retain high viability (e.g., greater than 70%, 75%, 80%, 85%, or 90%) and retain physiological characteristics of their native state, which allows the cells to be used for a variety of applications, such as for genetic manipulation of the cells, and for cell therapy purposes such as, for example, in adoptive cell therapy applications.

Various genetic modifications and associated uses can be successfully performed with the cells cryopreserved as described herein. As one example, T cells, either directly isolated or prepared from iPS origin (i.e., iT cells) can be cryopreserved as described herein. These cells can subsequently be thawed and genetically modified in a desired manner, for example through the introduction of a desired chimeric antigen receptor (CAR). These genetically modified iT cell to express CAR (i.e., iCART cells) can subsequently be either cryopreserved or introduced into a patient in need thereof by adoptive cell therapy methods. Such cells retain high viability and are able to proliferate within the recipient subject.

EXAMPLES

Other features, objects, and advantages of the present invention are apparent in the examples that follow. It should be understood, however, that the examples, while indicating embodiments of the present invention, are given by way of illustration only, not limitation. Various changes and modifications within the scope of the invention will become apparent to those skilled in the art from the examples.

Example 1

Preparation of Cryo-Formulations to Cryopreserve Cells

This example illustrates different cryo-formulations that were prepared to cryopreserve iCART cells.

In this example, eleven different cryo-formulations were prepared. The cryo-formulations were cryo-formulation #1, cryo-formulation #2, cryo-formulation #3, cryo-formulation #4, cryo-formulation cryo-formulation #6, cryo-formulation #7, cryo-formulation #8, cryo-formulation #9, cryo-formulation #10, and cryo-formulation #11. The composition of all these cryo-formulations are shown in FIG. 1. The efficacy of these cryo-formulations were tested by cryopreserving wild-type iCART cells, and then evaluating their in vivo efficacy in NOD/Shi-scid, IL-2R gamma null mice ("NSG mice"). T cell activation is an antigen-dependent process leading to proliferation and differentiation of naive T cells into effector cells, Primary CART cells and fresh CART cells were used as positive controls. The detail procedure is provided below in Example 3.

Example 2

Preparation of KART Cells

This example illustrates preparation of iCART cells prior to evaluation of their in vivo efficacy. FIG. 2 is a schematic illustration of preparation of iCART cells from frozen iT cells.

The iCART cells were derived from iT cells. Frozen iT cells were thawed (day 1), and were allowed to recover for next three days. On day 4, iT cells were allowed to undergo first activation step (Activation-1). This was done by culturing the iT cells with activation as performed according to a known method (e.g., method described in WO 2017/221975).

On day 7, the cells underwent a first transduction step (Transduction×1), this is done by spinoculation of the iT cells with retroviral vector on a retronectin coated plate. On day 8, the cells underwent a second transduction step (Transduction×2). This is done by spinoculation of the cells obtained in Transduction×1 with retroviral vector on a retronectin coated plate. On day 16, these cells underwent a second activation (Activation-2). This is done by culturing the cells obtained in Transduction×2 with activation medium (which contains IMDM (Thermo Fisher), 15% FBS, 1×PSG), Insulin-Transferrin-Selenium Supplements, Ascorbic acid2-phosphate, IL-7, IL-12, IL-18, IL-21, TL-1A, Pan Caspase FMK inhibitor Z-VAD, and CD30 agonistic antibody) in a CD3 coated flask for 3 days. After activation for three days, the cells were expanded for 12 days (Expansion 1) while undergoing activation and transduction processes. After second activation, cells were expanded for further 8 days (Expansion 2). On day 24, the cells obtained in Expansion 2 (i.e., iCART cells) were cryopreserved using different cryo-formulations. On day 28, iCART cells, thus prepared, were ready to be injected into the NSG mice.

Example 3

Comparison of the In Vivo Efficacies of Wild-Type iCART Cells that were Preserved Using Different Cryo-Formulations This example compares the in vivo efficacy of wild-type iCART cells that were cryopreserved using three different cryo-formulations—cryo-formulation #2, cryo-formulation #6, and cryo-formulation #10. Different treatment groups including these three cryo-formulations and doses are shown in FIG. 3A.

The in vivo efficacy of wild-type iCART cells were tested in NSG mice. The NSG mice were transplanted with luciferase expressing Nalm6 cells (ATCC; cancer cells). The NSG mice, male, 4-5-week-old were sourced from The Jackson Laboratory. Four days after the transplantation of Nalm6 cells, iCART cells that were cryopreserved using different cryo-formulations, were administered to the Nalm6-transplanted NSG mice via tail vein. After the administration of iCART cells or primary CART cells or fresh to the mice, luciferin was administered to the mice via tail vein. Luciferase activity was measured using IVIS imaging system (PerkinElmer) in terms of total radiance flux for over 60 days post-Nalm6 inoculation. The same procedure described here will also apply to other examples where the in vitro efficacy of cells is discussed.

Figures 3B, 3C:
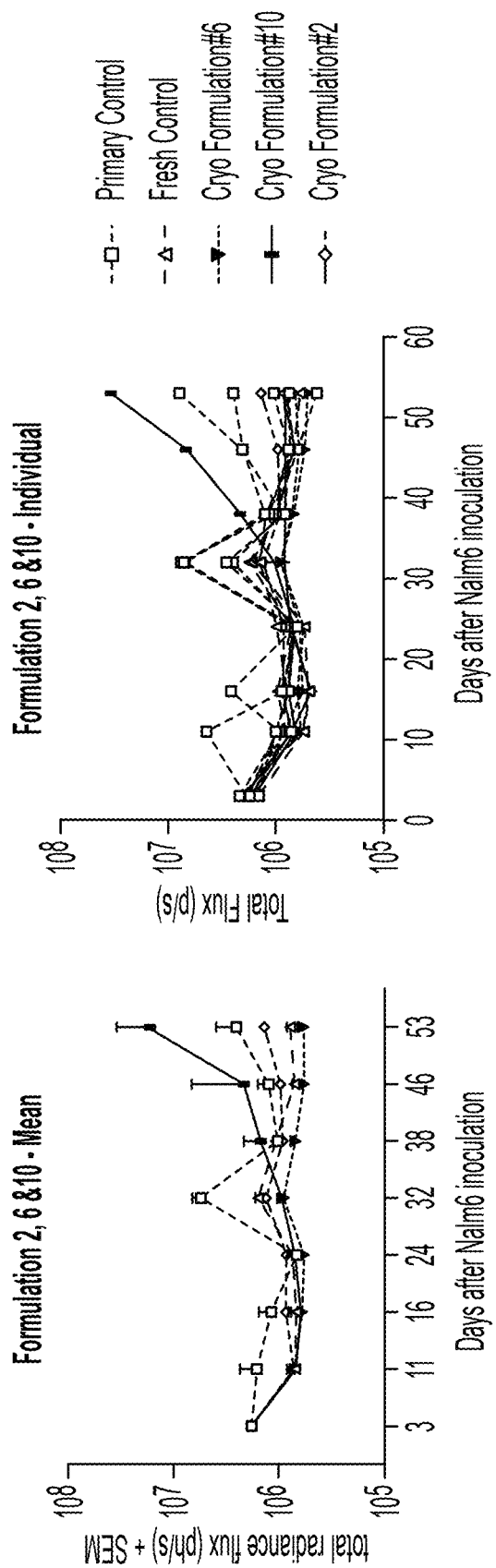
FIG. 3B illustrates the mean in vivo efficacy of iCART cells that were cryopreserved using cryo-formulation #2, cryo-formulation #6, and cryo-formulation #10.
FIG. 3C illustrates the in vivo efficacy of iCART cells in each mice that were cryopreserved using cryo-formulation #2, cryo-formulation #6, or cryo-formulation #10. The in vivo efficacy of iCART cells was expressed in teens of total radiance flux.

These experiments indicated that cryo-formulation #6 had the most pronounced reduction in FLUX, indicating in vivo efficacy at reducing the amounts of Nalm6 cells in the test animal (FIGS. 3B and 3C).

Example 4

Effect of Washing of Cryo-Formulations on the In Vivo Efficacy of Wild-Type iCART Cells This examples illustrates the effect of inclusion of washing steps in preparation of iCART cells that were cryopreserved using different cryo-formulations prior to their administration to the mice. In this example, the following three formulations, as provided in Table 1, were tested.

TABLE 1

| Formulation Number | Formulation compositions |
| --- | --- |
| Formulation 1 | 50% CS10 + 50% Expansion medium (IMDM + 15% Human serum + Cytokines*); *Cytokines: IL-7 and IL-15 at a final concentration 5 ng/mL |

TABLE 1-continued

| Formulation Number | Formulation compositions |
|---|---|
| Formulation 2 | 50% CS10 + 50% Expansion medium (IMDM + 5% HSA + Cytokines*); *Cytokines: IL-7 and IL-15 at a final concentration 5 ng/mL |
| Formulation 3 | STEM-CELLBANKER ® GMP grade |

The washing steps included washing the cryopreserved WART cells with 1× cold medium, washing once with cold DPBS, and resuspending the cells in cold DPBS prior to their injection into mice. Low and High wash were performed exactly you mentioned here: wash with 1× cold medium, washing once with cold DPBS, and resuspending the cells in cold DPBS prior to their injection into mice. For low and high dose we resuspended the final CAR+ cell concentration to 1.5E7/200 µL and 4.0E7/200 µL DPBS, respectively. The dose of the cells was based on post-thaw cell number count. In the no wash condition, the cryopreserved cells were not washed prior to their injection into mice. The cells were thawed and injected immediately after thawing along with the cryo-formulation. In no wash condition, the dose of the cells was based on pre-freeze cell count.

In order to test the effect of washing steps on the in vivo efficacy of iCART an experimental design, as illustrated in FIG. 4, was adopted. The in vivo efficacy of iCART cells were assessed by measuring the luciferase activity using IVIS imaging system (PerkinElmer) over a period of two weeks.

Figure 5:
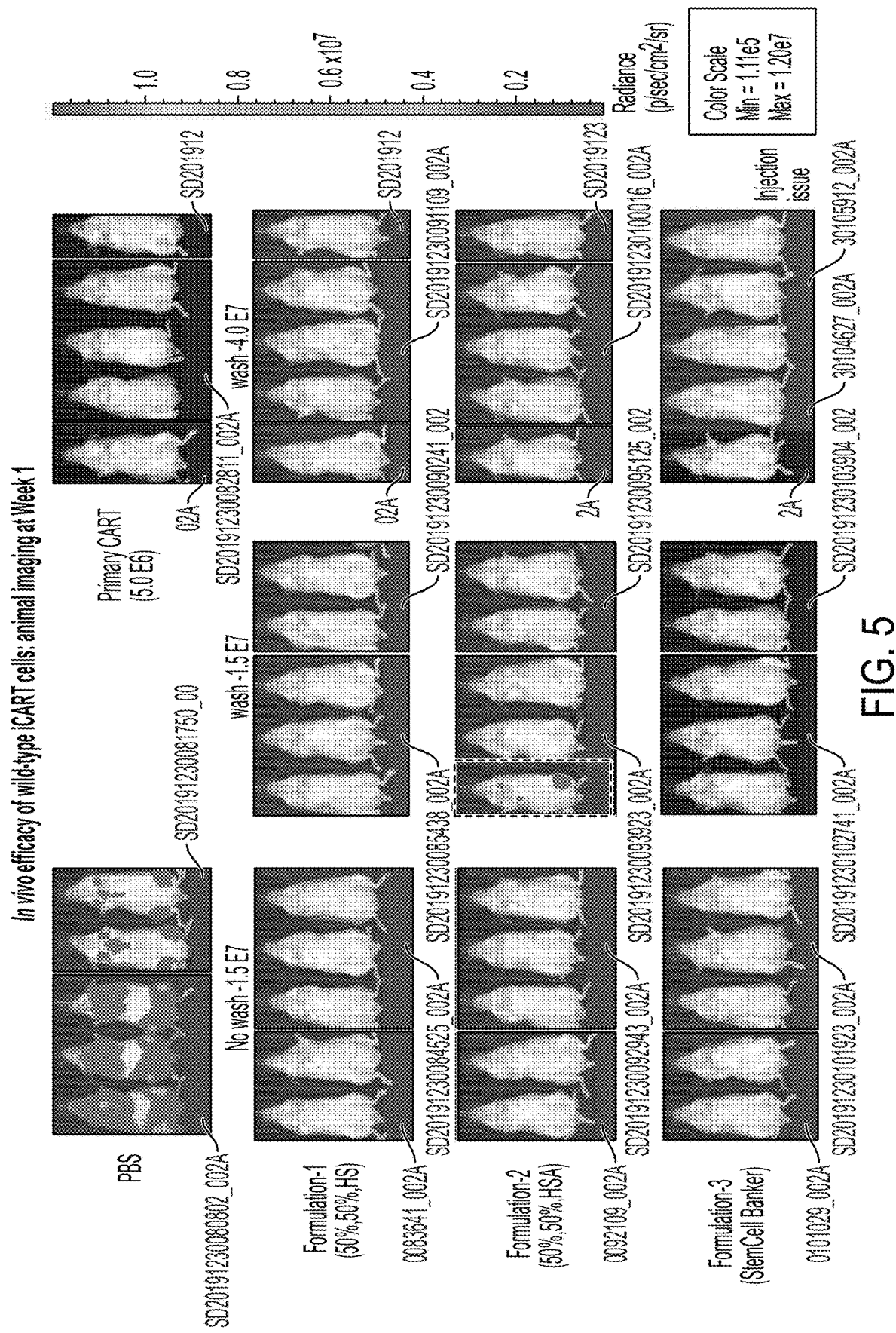
FIG. 5 illustrates the in vivo efficacy of iCART cells that were cryopreserved using formulations illustrated in FIG. 4. The in vivo efficacy of iCART cells expressed in terms of luciferase expression was measured one week post-administration of iCART cells.

FIG. 5 illustrates the in vivo efficacy of iCART cells one week post-administration of iCART cells. The mice that only received PBS buffer and no iCART cells showed a very high luciferase expression. The mice that received primary CART cells did not show any sign of luciferase expression. The mice treated with different formulations showed a negligible sign of luciferase expression demonstrating the in vivo efficacy of WART cells that were cryopreserved using different cryo-formulations. The one mouse that received washed formulation 2/low wash and is identified in the figure by a rectangular box was impacted by an injection related problem.

Figure 6:
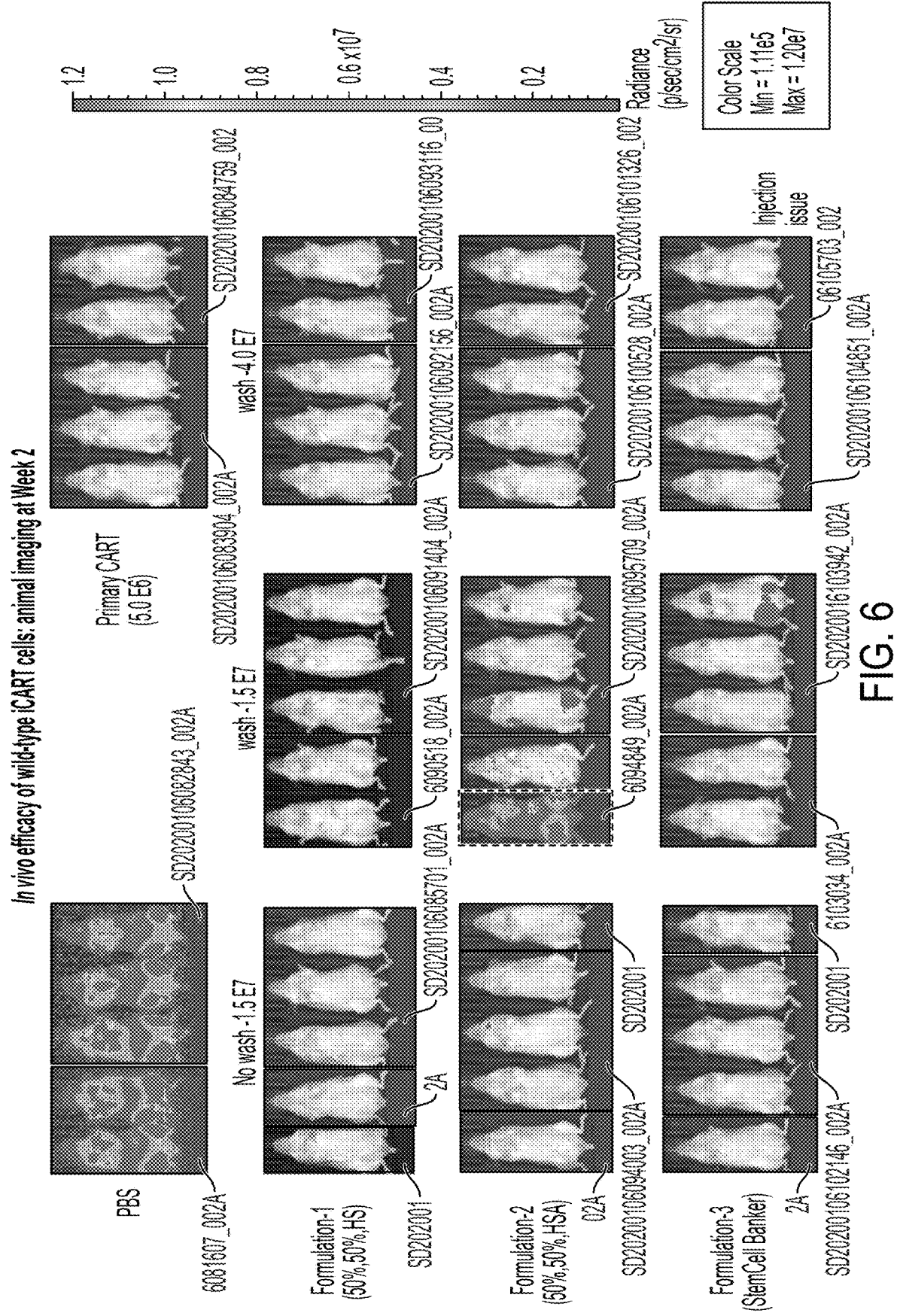
FIG. 6 illustrates the in vivo efficacy of WART cells that were cryopreserved using formulations illustrated in FIG. 4. The in vivo efficacy of iCART cells expressed in terms of luciferase expression was measured two weeks post-administration of iCART cells.

FIG. 6 illustrates the in vivo efficacy of iCART cells two weeks post-administration of iCART cells. The mice that only received PBS buffer and no iCART cells showed even more intense luciferase expression compared to that of week 1. The mice that received primary CART cells still do not show any sign of luciferase expression. In general, mice treated with different formulations showed no to negligible sign of luciferase expression demonstrating the in vivo efficacy of iCART cells that were cryopreserved using different cryo-formulations. However, the mice treated with formulation 2/low wash and formulation 3/low wash showed some luciferase expression unlike mice treated with other formulations indicating high wash or no wash steps better preserve iCART cells.

Example 5

In Vivo Efficacy of Fresh WART Cells vs Cryostock iCART Cells

This examples compares the in vivo efficacy of fresh iCART cells vs cryostock iCART cells. In this example, five different formulations, as provided in FIG. 7A, were tested. IL-7 and IL-15 were added as cytokine in the conditions #1, 2 and 4.

iCART cells were expanded prior to the formulation. To perform expansion culture of iCART cells, the cells were suspended as 2,000,000 cells in 15 mL of IMDM medium containing 15% FBS and cytokines shown in Table 2 and seeded on a T25 flask where anti-CD3 antibody (OKT3) and retronectin (Takara Bio) were immobilized. Cell culture was performed under 5% CO2/37° C. After 3 days, the cells were collected, and cell number was counted using Nucleo-Counter NC-200 (ChemoMetec). The cells were suspended in an appropriate amount in IMDM medium (Thermo Fisher) containing 15% BS and cytokines shown in Table 3, then added to a non-solidified G-REX 6M plate (WILSON-WOLF) and cultured under 5% CO2/37° C. for four days.

TABLE 2

| Item | Vendor | Final concentration |
|---|---|---|
| Insulin-Transferrin-Selenium Supplements | Invitrogen | 1 x |
| Ascorbic acid 2-phosphate | Sigma | 50 µg/mL |
| IL-7 | Peprotech | 10 ng/mL |
| IL-12 | Merck | 50 ng/mL |
| IL-15 | Peprotech | 10 ng/mL |
| IL-18 | MBL | 50 ng/mL |
| IL-21 | Peprotech | 20 ng/mL |
| TL-1A | Peprotech | 50 ng/mL |
| z-VAD-FMK | R&D | 10 µM |
| Anti-CD30 antibody | R&D | 300 ng/mL |

TABLE 3

| Item | Vendor | Final concentration |
|---|---|---|
| Insulin-Transferrin-Selenium Supplements | Invitrogen | 1 x |
| Ascorbic acid 2-phosphate | Sigma | 50 µg/mL |
| IL-7 | Peprotech | 10 ng/mL |
| IL-15 | Peprotech | 10 ng/mL |

Following the iCART cells expansion step, the cells were harvested from G-REX then washed with washing buffer (5% HSA in Isolyte S) using Sefia S-2000 Cell Processing instrument and the cells were concentrated to a final volume of approximately 50 mL in preparation for the formulation and cryostock. The cryostock were prepared by cryopreserving the cells using CryoMED™ and stored in −150° C. freezer.

Figure 7C:
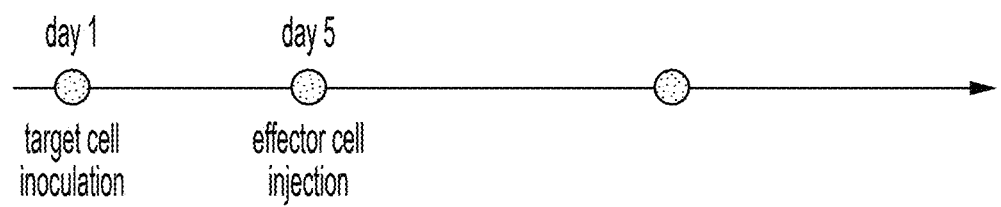
FIG. 7C is a schematic illustration of the schedule followed to administer the target and effector cells (fresh or cry-stock iCART cells) in the experimental design illustrated in FIG. 7B.

In order to compare the in vivo efficacy of fresh iCART cells and cryostock iCART cells, an experimental design, as illustrated in FIG. 7B, was used. 17 days after cryopreservation, the cryostock iCART cells of Gr-10 and 11 in FIG. 7B were thawed by ThawSTAR and washed twice by cold IMDM and re-suspended in D-PBS at the concentration of 1.0E+07 CART cells/dose. 7-14 days after cryopreservation, the cryopreserved cells of Gr-2-9 were thawed by Thaw-STAR and washed by IMDM, then cultured or expanded, then washed and re-suspended in D-PBS at the concentration of 1.0E+07 CART cells/dose (as described in FIG. 7B). Fresh iCART cells or a cryostock iCART cells were administered four day post-inoculation of the target cells (i.e., Nalm6 cells) in NSG mice, as illustrated in FIG. 7C. A suspension of iCART cells were administered via tail vein. Same volume of PBS was administered as control. The administration overviews are described in FIG. 7B. The iCART cells in the Gr-2, 4 and 6 were expanded for 7 days in the same way as above. The iCART cells in the Gr-3, 5, 7, 8 and 9 were cultured for 3 days in the IMDM supplemented with IL-7 and IL-15. The in vivo efficacy of iCART cells were assessed by measuring the luciferase activity using IVIS Imaging System (IVIS LUMINAII, manufactured by CaliperLS) over a period of six weeks.

Figure 8:
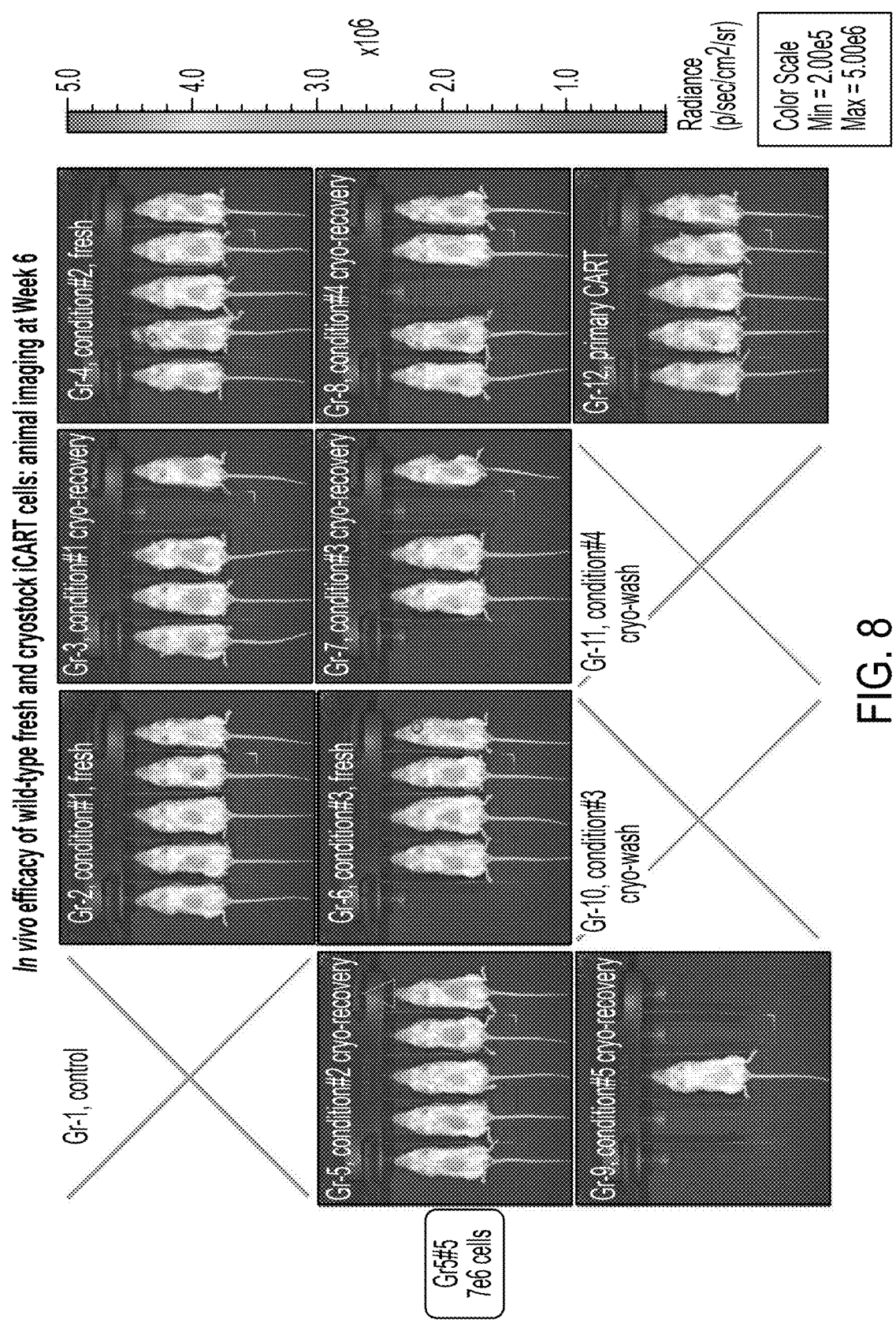
FIG. 8 illustrates the in vivo efficacy of WART cells six week post-administration of fresh or cryo-stock iCART cells. The in vivo efficacy of iCART cells was expressed in terms of luciferase expression in mice.
Figure 9A:
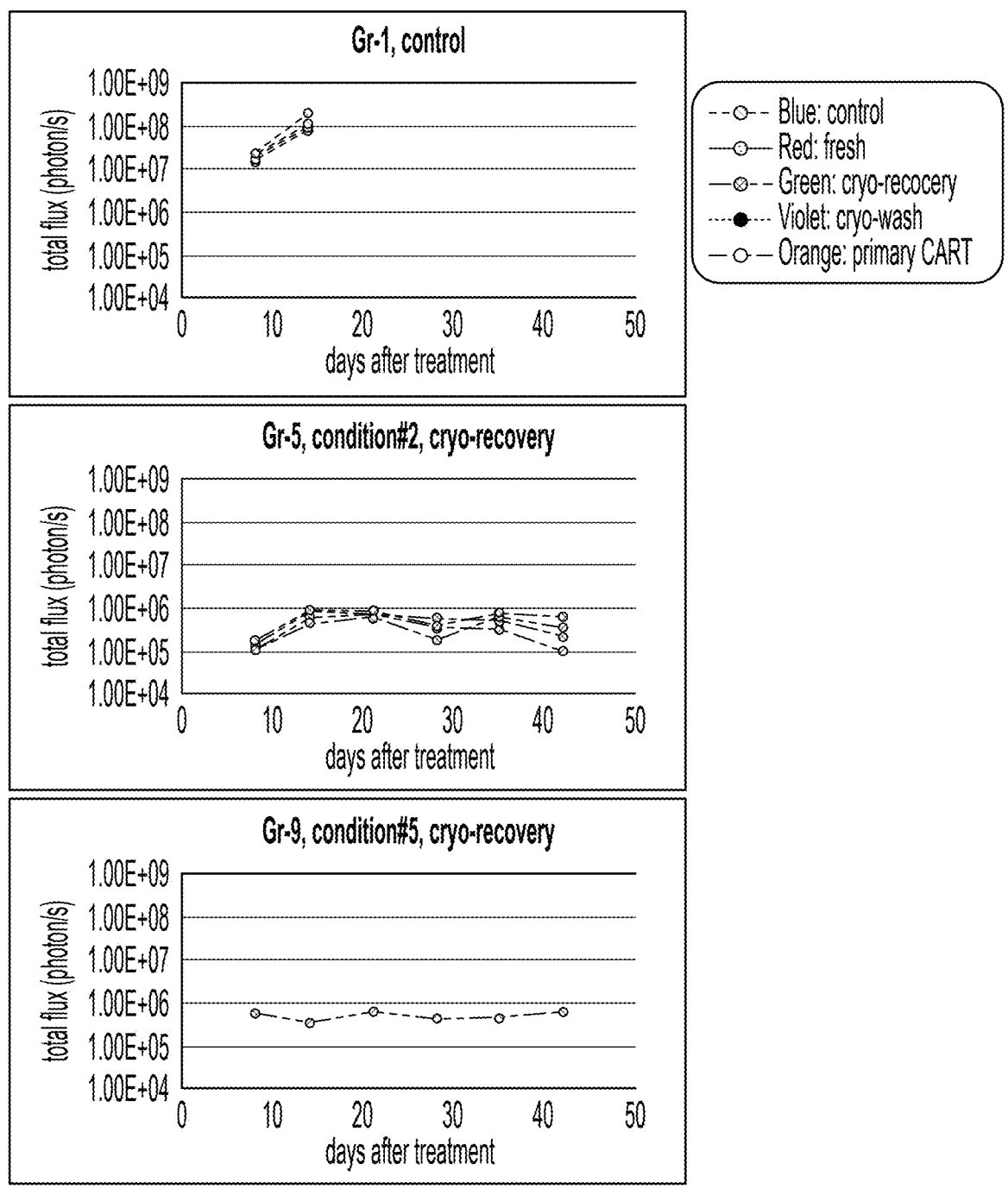
FIG. 9A, FIG. 9B, FIG. 9C, and FIG. 9D illustrate the in vivo efficacy of iCART cells six week post-administration of fresh or cryo-stock WART cells. The in vivo efficacy of iCART cells have been expressed in terms of total flux, a quantitative expression of the luciferase expression level.
Figure 9B:
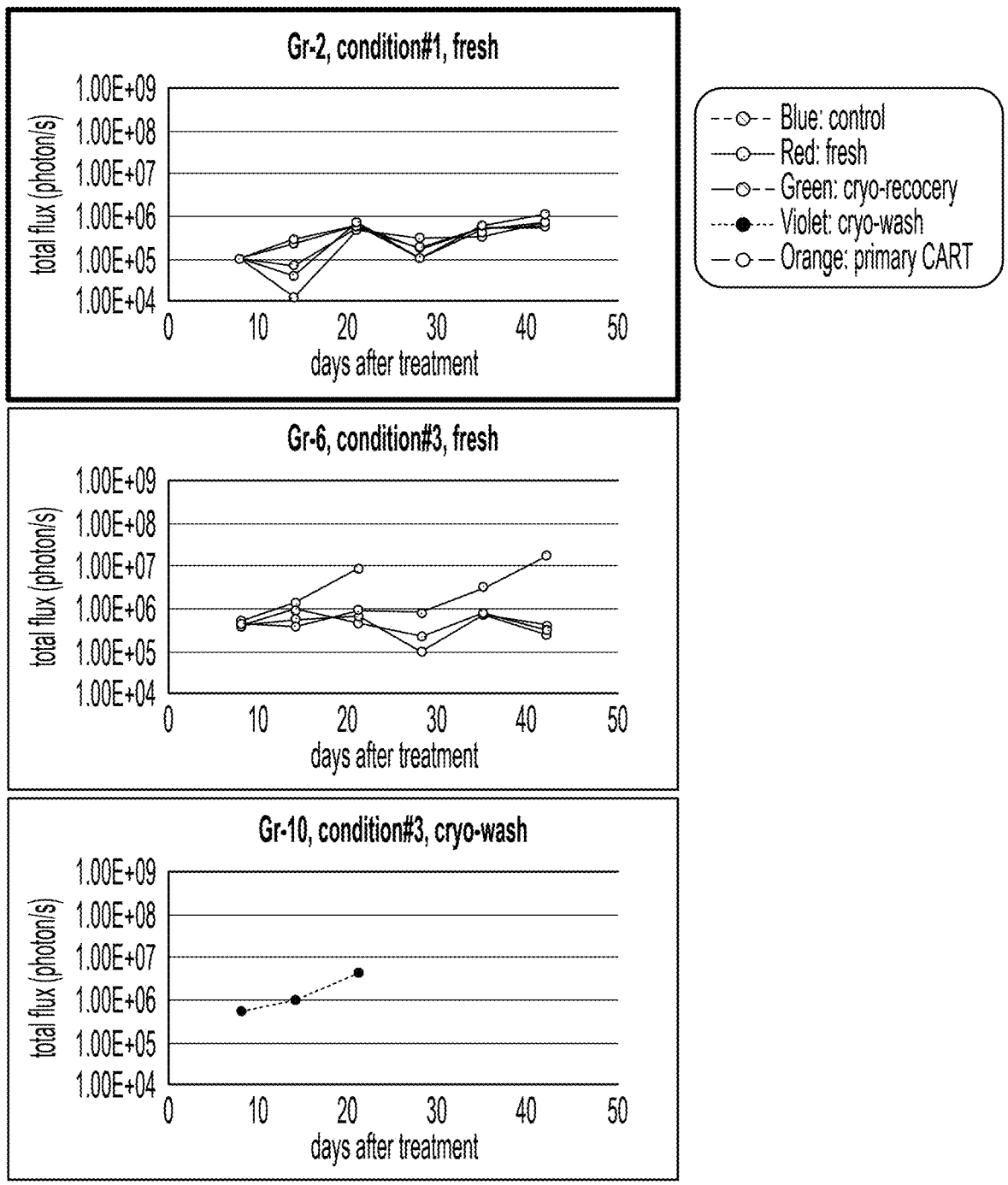
Figure 9C:
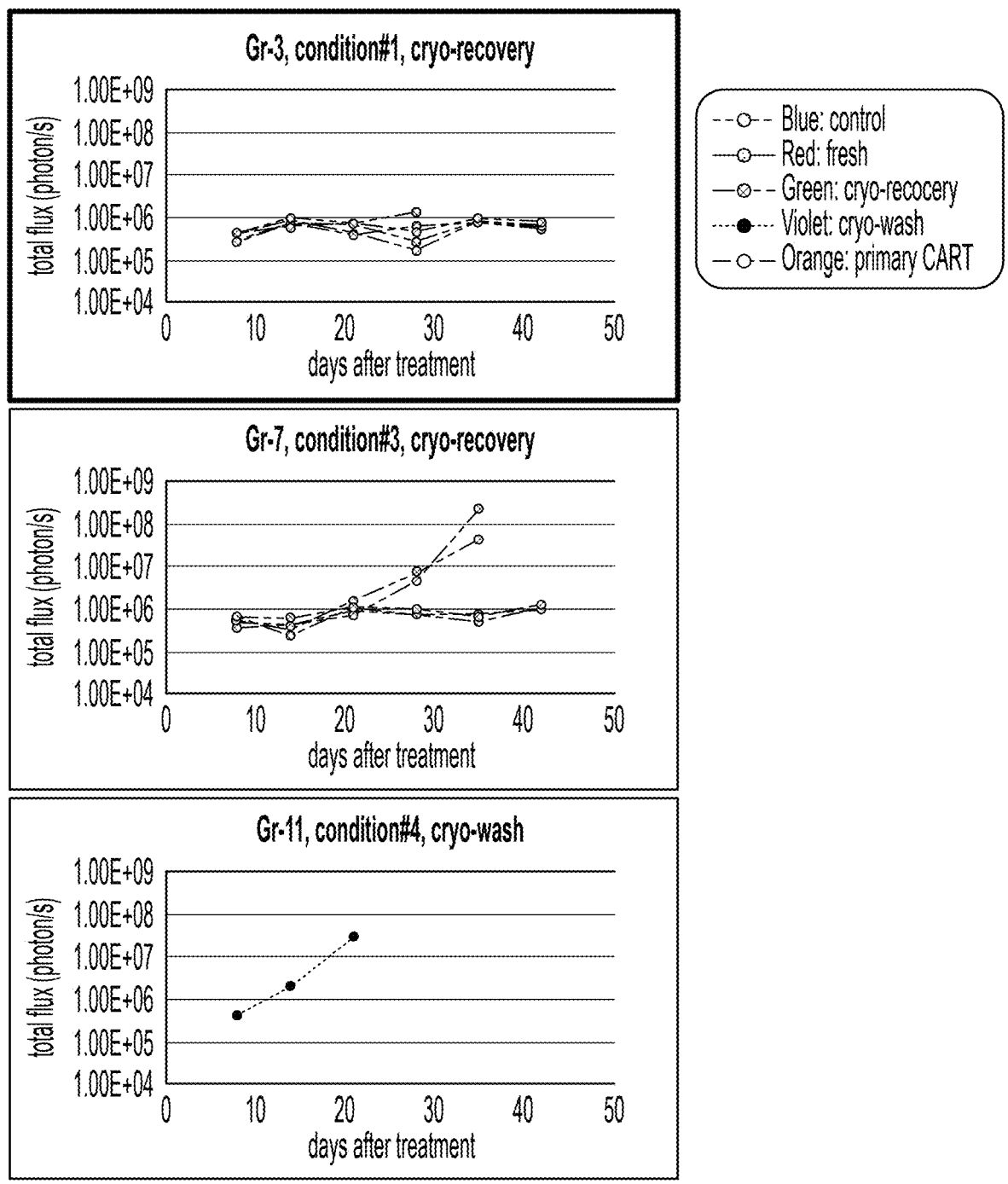
Figure 9D:
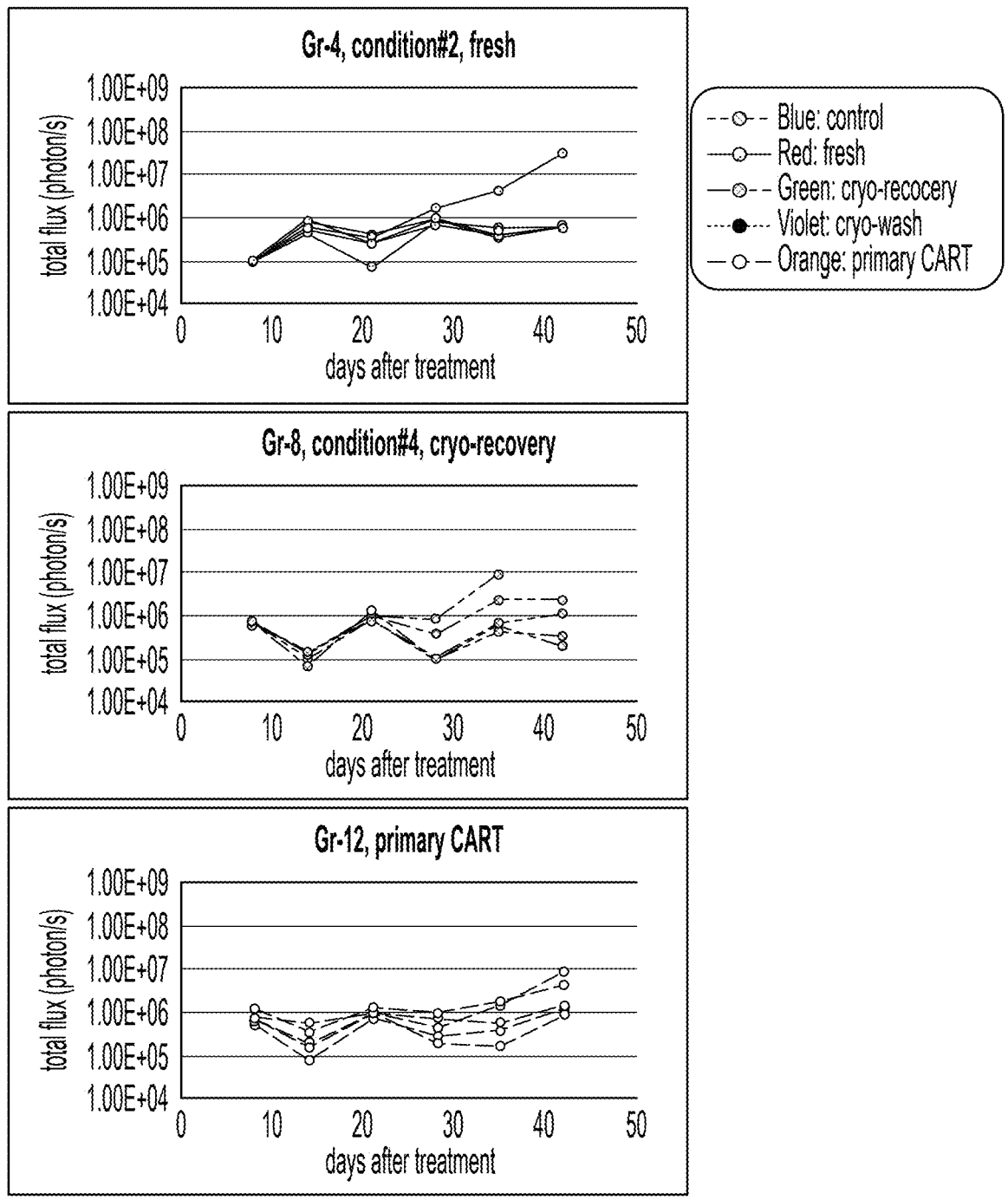
Figure 11B:
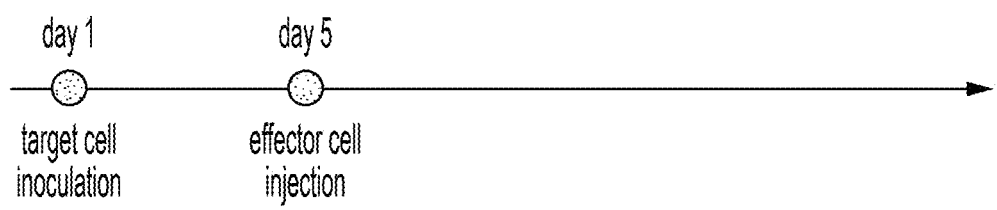

FIG. 8 illustrates the in vivo efficacy of iCART cells after six week post-administration of fresh or cryo-stock iCART cells. The mice that only received PBS buffer (control) or Gr-10/condition #3/washed cryostock or Gr-11/condition #4/washed cryostock did not survive for six weeks as shown by a cross (x) sign in FIG. 8. The mice that received Gr-12 (primary CART cells)/cryostock showed a very negligible luciferase expression. The mice that received Gr-2/fresh cells did not show any luciferase expression. Mice treated with other formulations/conditions showed no to negligible sign of luciferase expression demonstrating the in vivo efficacy of cryostock iCART cells that were cryopreserved using different cryo-formulations. All mice treated with Gr-2, condition #2, cryo-recovery survived over six weeks and did not show any sign of luciferase expression, indicating this formulation to be among the most efficacious formulations.

FIG. 9A, FIG. 9B, FIG. 9C, and FIG. 9D illustrate the in vivo efficacy of iCART cells six week post-administration of fresh or cryo-stock iCART cells. The in vivo efficacy of iCART cells have been expressed in terms of total flux, a quantitative expression of the luciferase expression level. All treatment groups, except Gr-1, control; Gr-10, condition #3, cryo-wash; and Gr-11, condition #4, cryo-wash, showed in vivo efficacy of iCART cells at the end of six weeks. Importantly. Gr-3, condition #1, cryo-recovery; Gr-5, condition #2, cryo-recovery; and Gr-8, condition #4, cryo-recovery were some of the most efficacious formulations.

Example 6

Evaluation of the In Vivo Efficacy of iCART Cells Cryopreserved Using Formulations with and without Cytokines This example illustrates the evaluation of the in vivo efficacy of iCART cells that were cryopreserved using formulations with and without cytokines (IL-2, IL-7 and IL-15). The iCART cells in this example were obtained in the same way as Example 5. Following the T cell expansion step, the cells were harvested from G-REX then washed with washing buffer (5%1-ISA in Isolyte S) using Sefia S-2000 Cell Processing instrument and cells were concentrated to a final volume of approximately 50 mL in preparation for the cryo-formulations. The cryo-formulations were prepared by cryopreserving the cells using CryoMED™ and stored in –150° C. freezer. In this example, thirteen different cryo-formulations were prepared. The cryo-formulations were formulation #1, formulation 42, formulation #3, formulation #4, formulation #5, formulation #6, formulation #7, formulation 48, formulation #9, formulation 410, formulation #11, formulation #12, and formulation #13. The compositions of all these formulations are shown in FIG. 10.

In order to evaluate the in vivo efficacy of iCART cells that were cryopreserved using these formulations (with and without cytokines (IL-7 and IL-15)), an experimental design, as illustrated in FIG. 11A1, FIGS. 11A2, and 11B, was used. A suspension of iCART cells were administered via tail vein. Same volume of PBS was administered as control. The administration overviews are described in FIG. 11A1 and FIG. 11A2.

Figure 12:
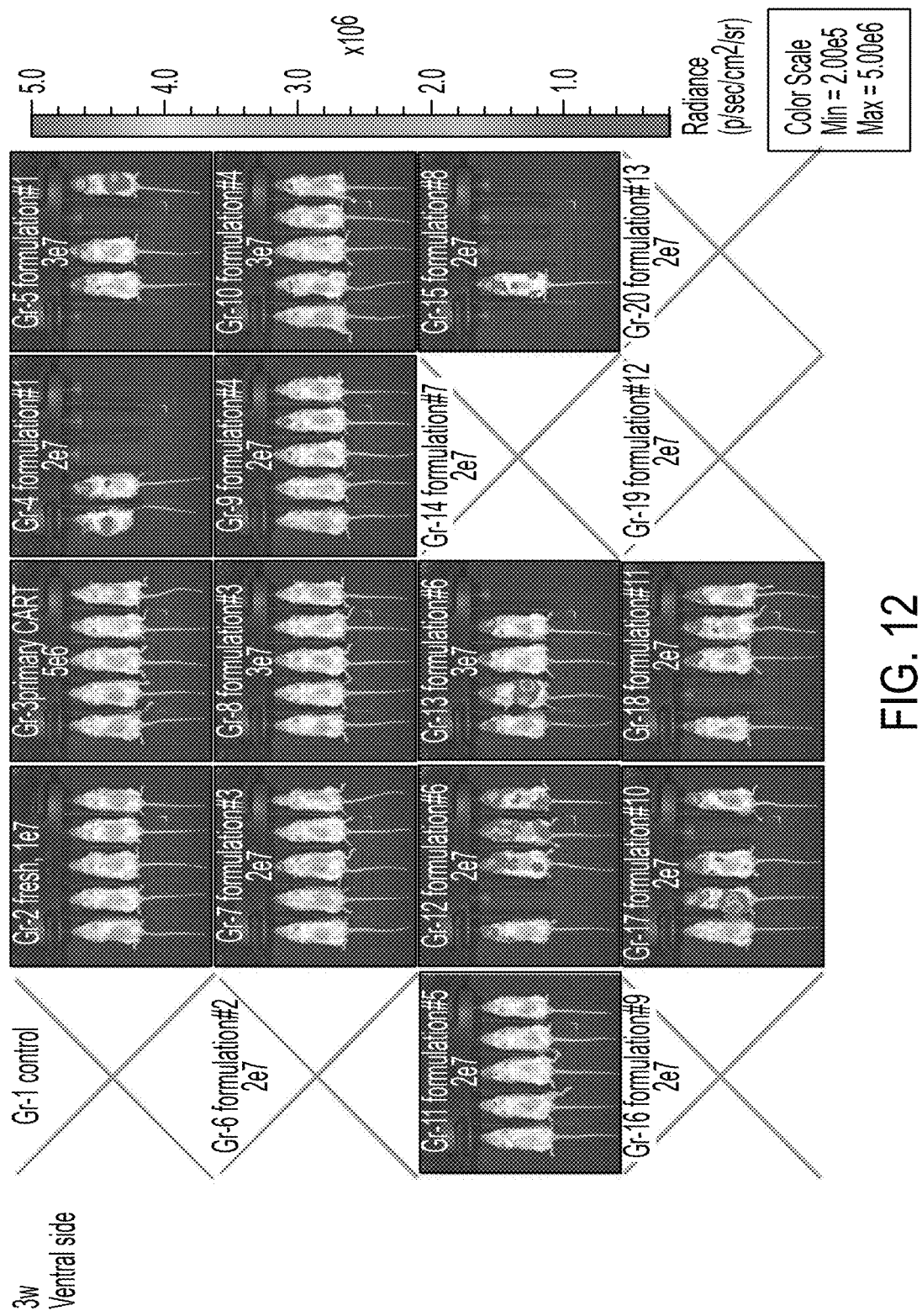
FIG. 12 illustrates the in vivo efficacy (in terms of luciferase expression.) of iCART cells three week post-administration of iCART cells.

FIG. 12 illustrates the in VITO efficacy of iCART cells three week post-administration of iCART cells. The in vivo efficacy of iCART cells have been expressed in terms of the level of luciferase expression. The mice that were treated with PBS buffer (control), or Gr-6 formulation #2 or Gr-14 formulation #7 or Gr-19 formulation #12 or Gr-20 formulation #13 did not survive for three weeks, as indicated by cross (x) signs in FIG. 12. The mice that received Gr-3 (primary CART cells) showed a very negligible luciferase expression in one of the five treated mice. The mice that received Gr-2 (Fresh iCART cells) showed some luciferase expression in two out of the five treated mice. Mice treated with other formulations/conditions showed varying degree of luciferase expression indicating varying in vivo efficacies of iCART cells that were cryopreserved using different cryo-formulations. Among the mice treated with one or the other formulations, treatment groups: Gr-7 formulation #3, Gr-8 formulation #3, Gr-9 formulation #4, and Gr-10 formulation #4, were the most efficacious formulations.

Figure 13:
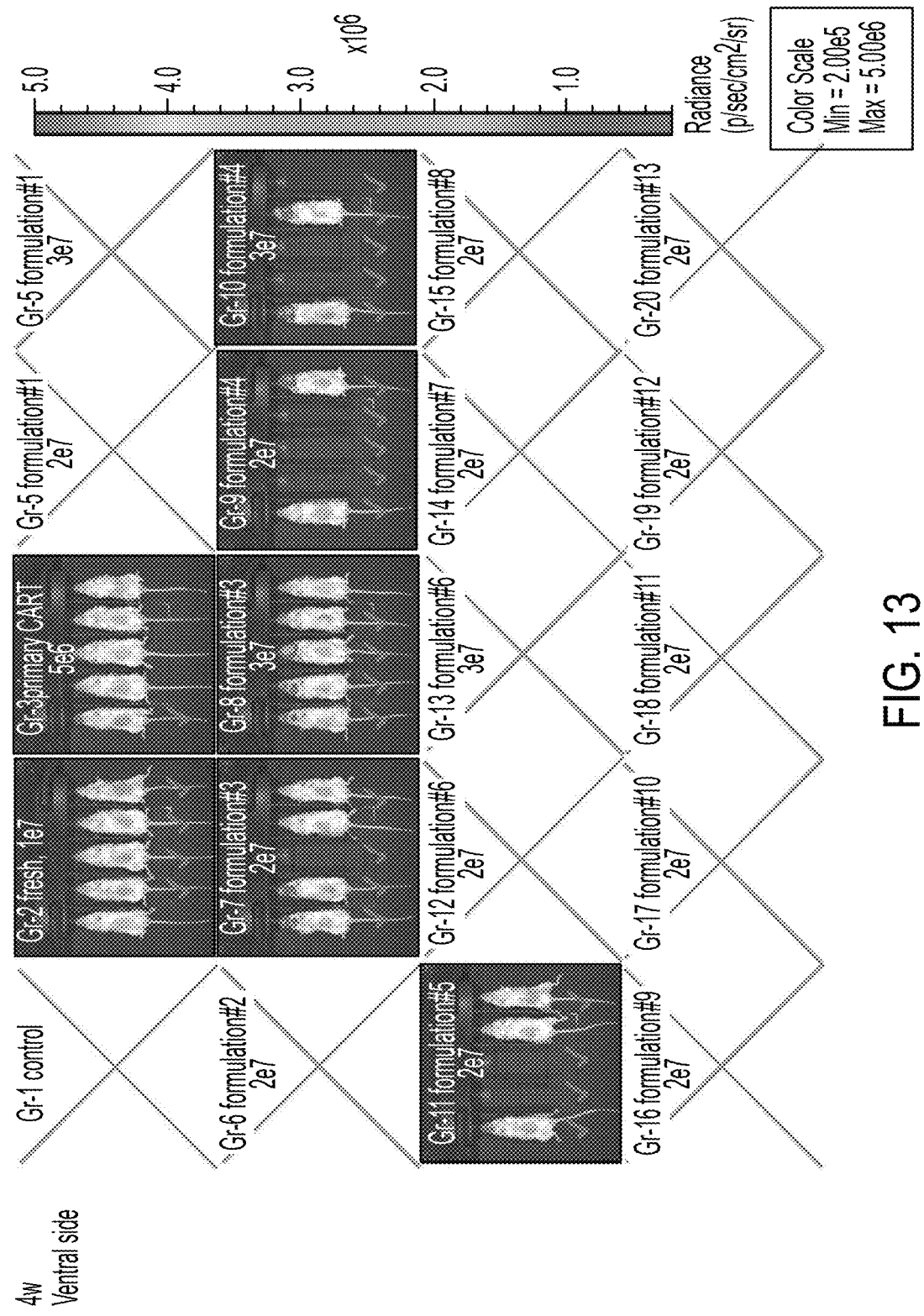
FIG. 13 illustrates the in vivo efficacy (in terms of luciferase expression.) of iCART cells four weeks post-administration of iCART
Figure 14A:
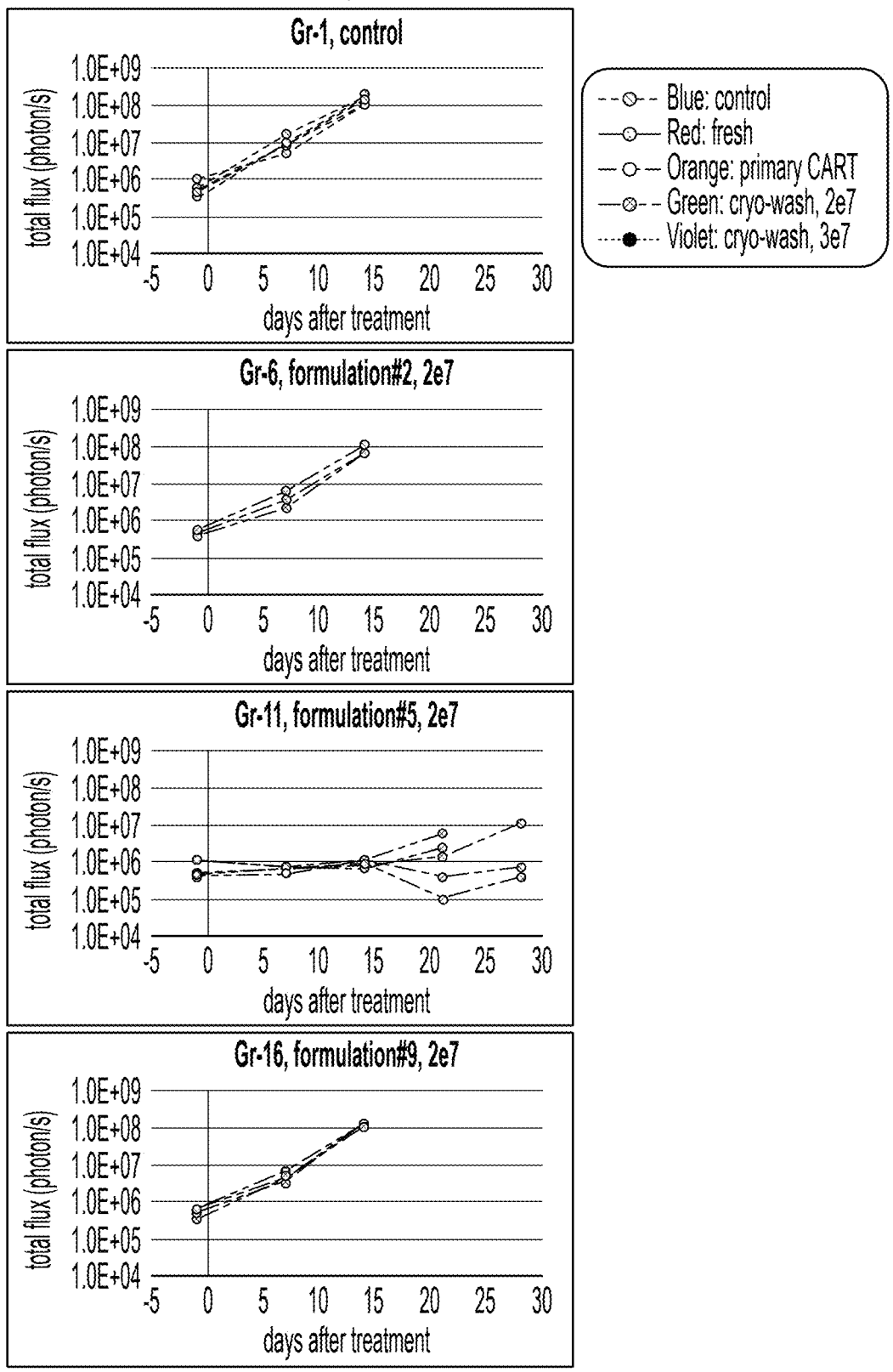
FIG. 14A, FIG. 14B, FIG. 14C, FIG. 14D, and FIG. 14E illustrate the in vivo efficacy of iCART cells four weeks post-administration of iCART cells. The in vivo efficacy of iCART cells was expressed in terms of total flux.
Figure 14B:
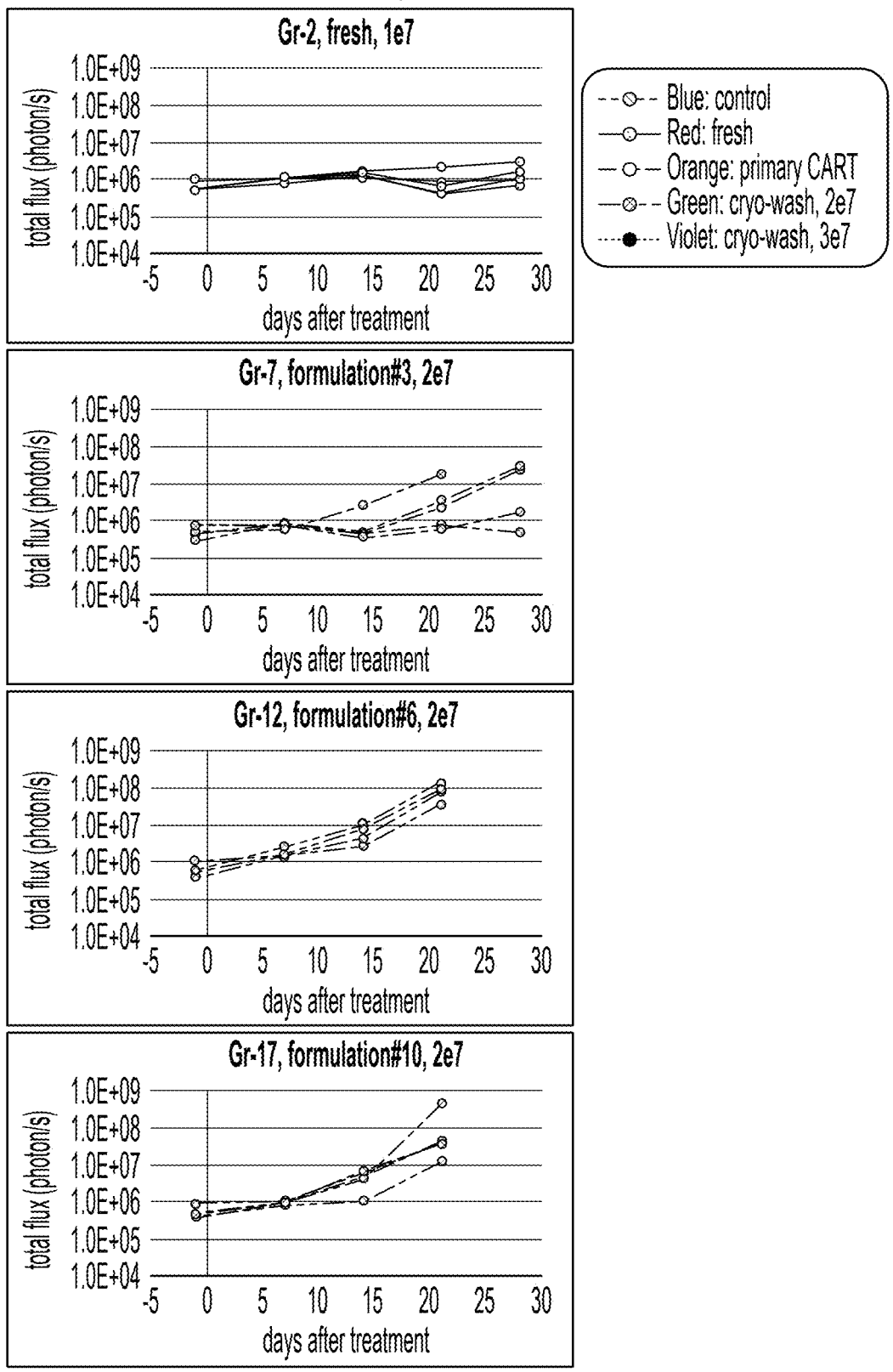
Figure 14C:
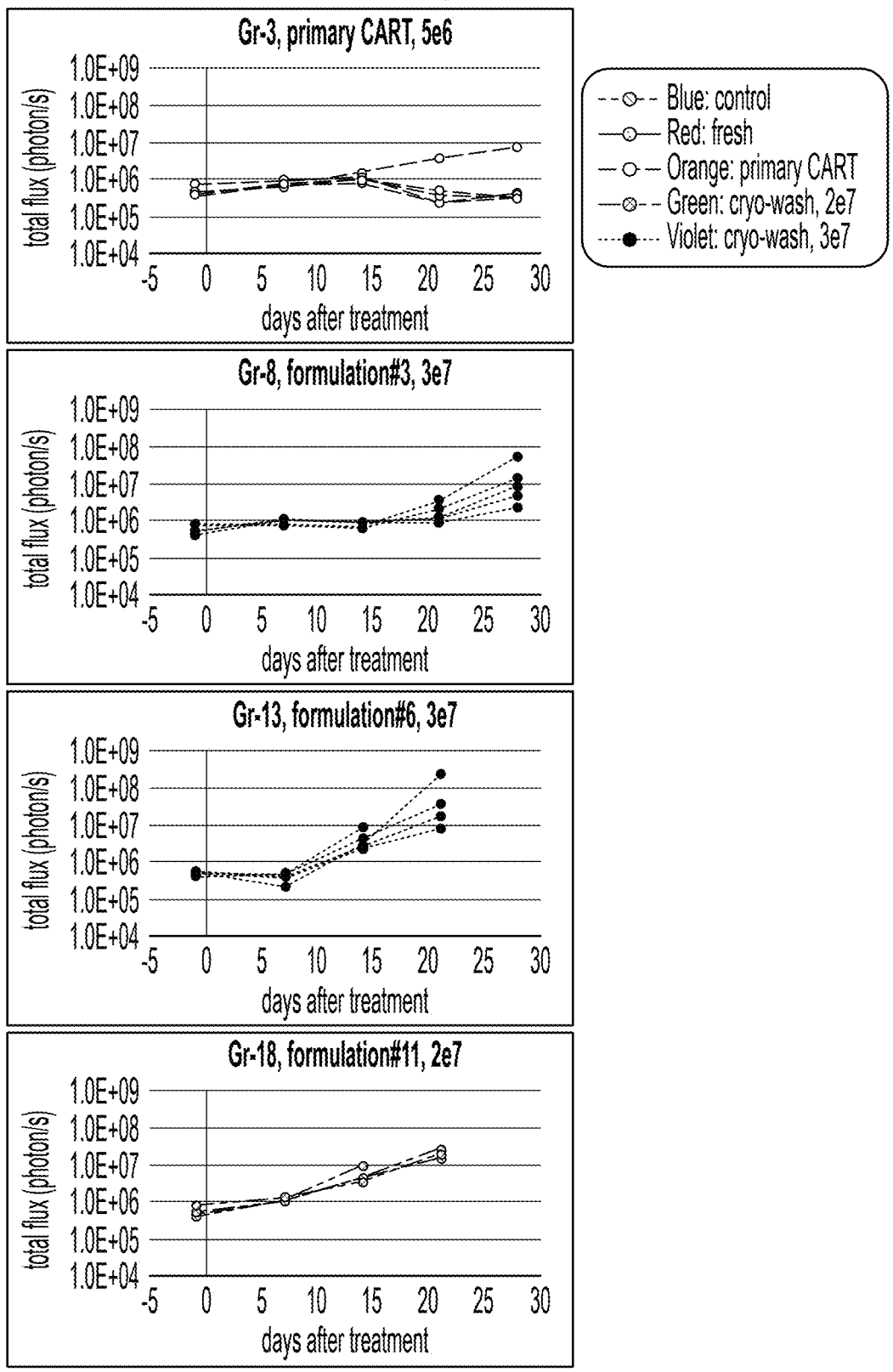
Figure 14D:
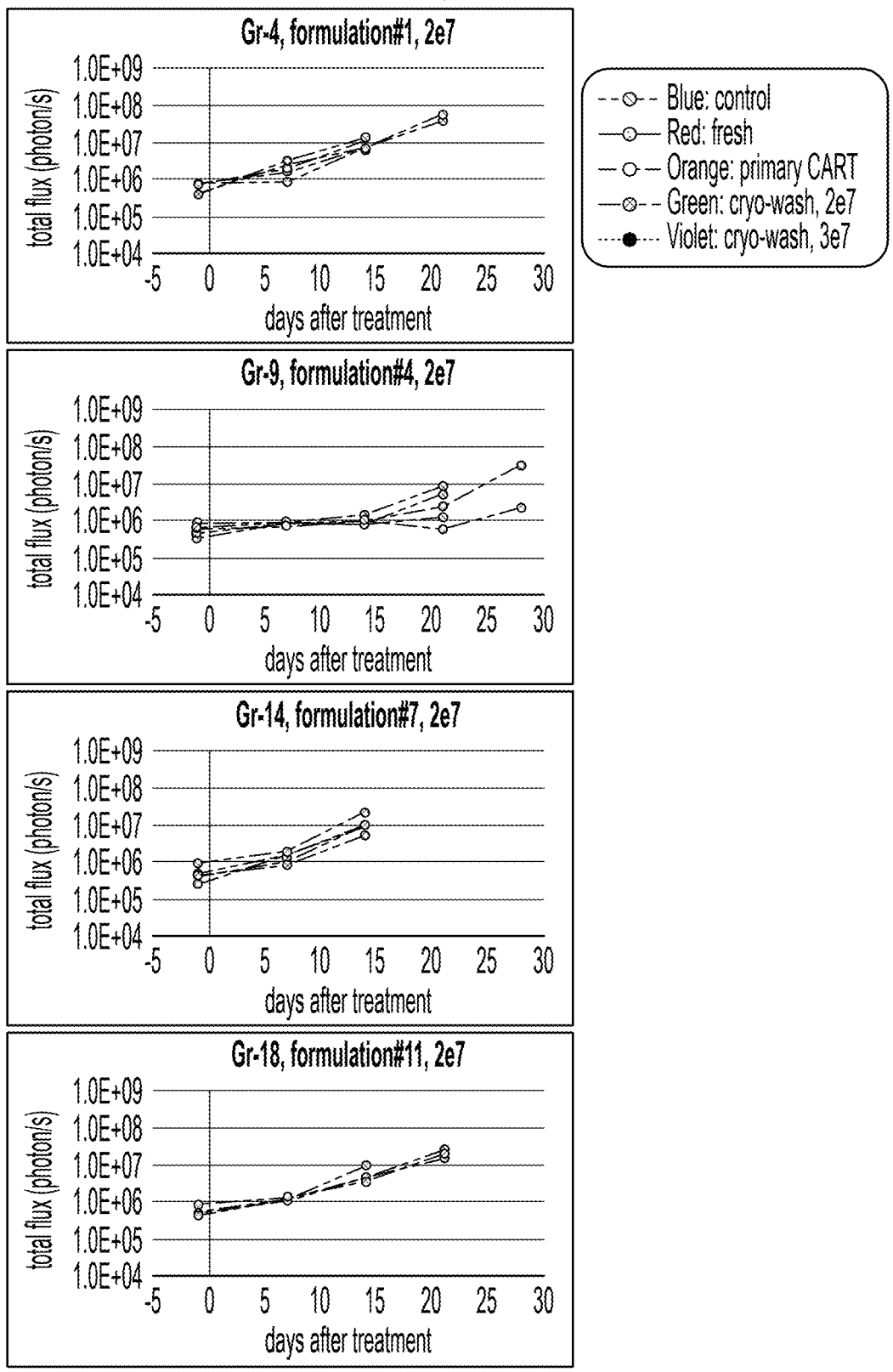
Figure 14E:
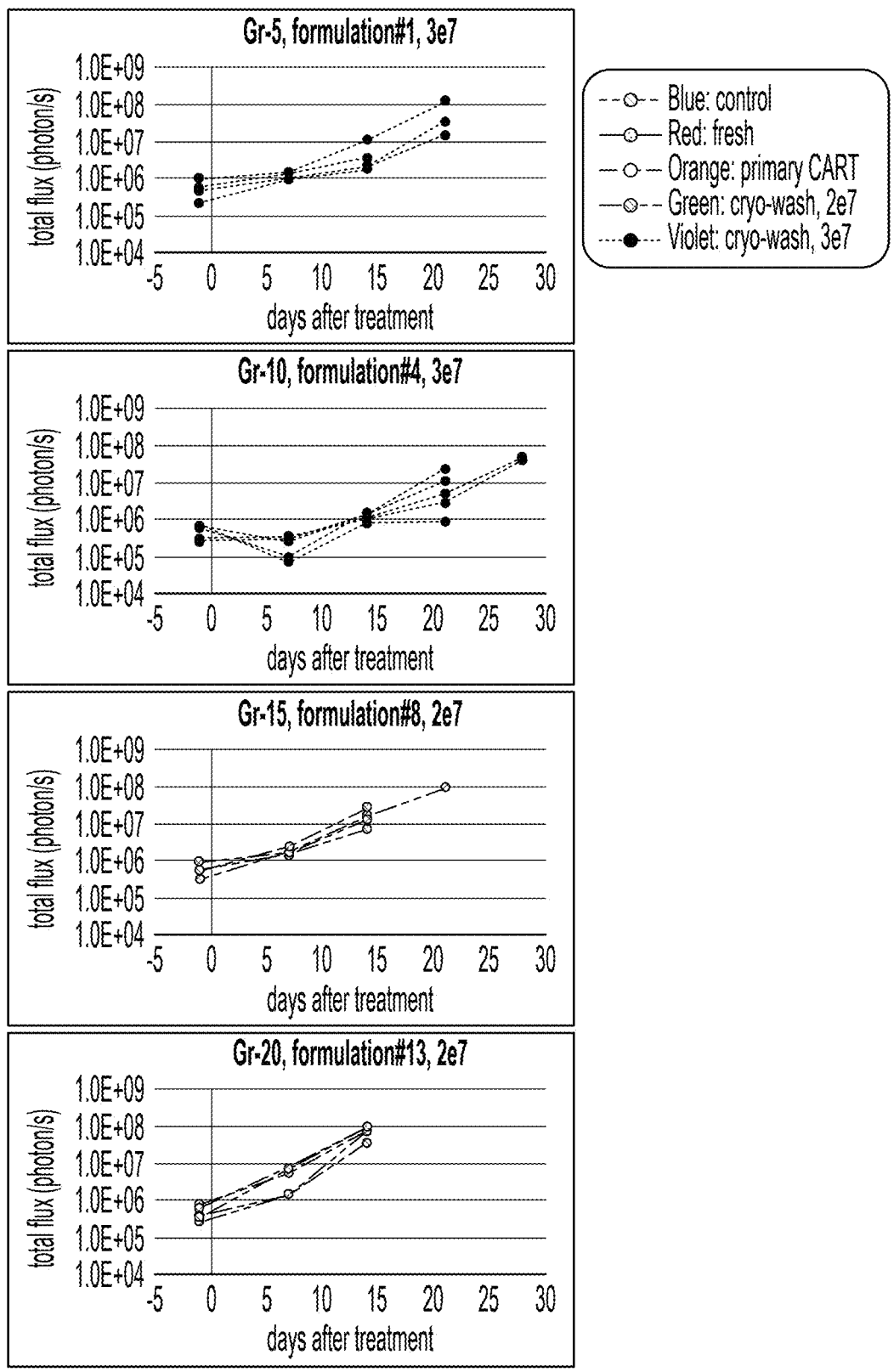

FIG. 13 illustrates the in vivo efficacy of iCART cells four weeks post-administration of iCART cells. At the end of four weeks, Gr-7 formulation #3, and Gr-8 formulation #3 were among the most efficacious formulations.

FIG. 14A, FIG. 14B, FIG. 14C, FIG. 14D, and FIG. 14E illustrate the in vivo efficacy of iCART cells four weeks post-administration of iCART cells. The in vivo efficacy of iCART cells was expressed in terms of total flux. The mice that received Gr-2 (Fresh iCART cells), a positive control group, showed the lowest total flux, indicating the most efficacious group. At the end of four weeks, Gr-7 formulation #3, Gr-8 formulation #3, and Gr-9 formulation #4 were among the most efficacious formulations.

Figure 15:
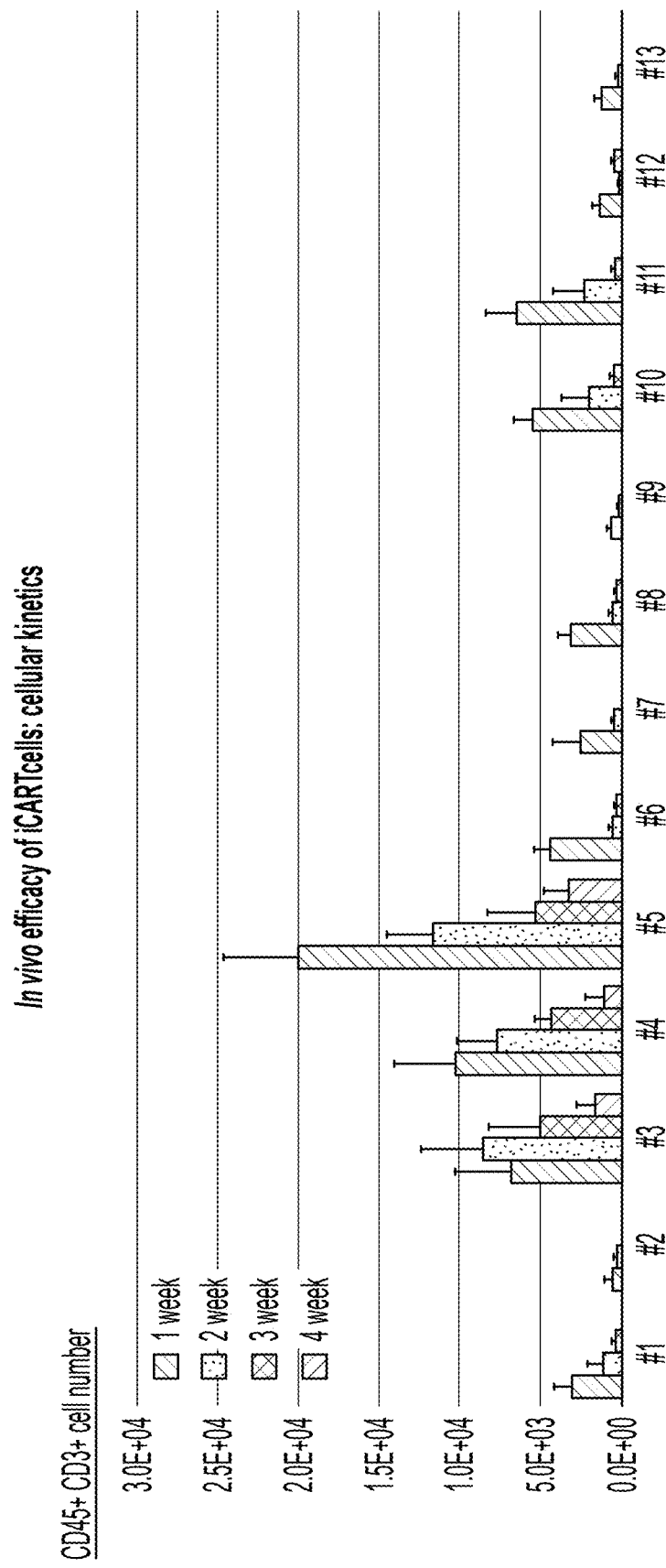
FIG. 15 illustrates the cellular kinetics (in terms of CD45+CD3+ cells) of iCART cells over four weeks after administration of iCART cells. The cellular kinetics of iCART cells was expressed relative to different formulations.

FIG. 15 illustrates the cellular kinetics of iCART cells over four weeks after administration of iCART cells. To evaluate in vivo persistence, cellular kinetics of WART in mice was analyzed. 30 μL of blood was collected from the tail vein. 0.3 μL of anti-human CD3 antibody (Clone UCHT1, BioLegend) and 0.3 μL of anti-human CD45 antibody (Clone HI30, BioLegend) were directly added to blood, and reacted at room temperature for 20 minutes. After the reaction, hemolysis and fixation was performed with a FACS lysing solution (BD Biosciences), and both human CD3 and CD45 double positive cells were detected as iCART with LSR Fortessa. (BD Biosciences). The cellular kinetics of WART cells were expressed in terms of CD45÷CD3+ cells. Among the formulations, formulation #3, formulation #4, formulation #5, formulation #10, and formulation #11 showed the higher expression of CD45+ CD+ cells compared to other formulations. This data is consistent with the results of in vivo anti-tumor efficacy. For example, iCART formulated with #3, 4 and 5 showed higher in vivo persistence than other conditions, which was closely linked to higher anti-tumor effects. The vendors of each components of the formulations used in the examples 5 and 6 are summarized in Table 4.

TABLE 4

| Components | Vendor |
|---|---|
| Isolyte S | B. Braun |
| IMDM(Iscove's Modified Dulbecco's Medium) | Thermo Fisher |
| PSG (Penicillin-Streptmycin-Glutamine) | Thermo Fisher |
| ITS (Insulin-Transferin-Selenium) | Invitrogen |
| pAA (Ascorbic acid 2-phosphate) | Sigma |
| Human Male AB Serum, HI GI | Access Cell Culture |
| Albuminar-25 (human) | CSL Behring |
| IL-2 | PeproTech |
| IL-7 | PeproTech |
| IL-15 | PeproTech |
| CryoStor ® CS10 | BioLife Solutions |
| Stem Cell Banker | ZENOAQ |

TABLE 4-continued

| Components | Vendor |
|---|---|
| Bambanker hRM | Lymphotec |
| BloodStor ® 100 (DMSO) | BioLife Solutions |
| Sucrose | WAKO |

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

We claim:

1. A composition comprising:
   mammalian immune cells that are primary cells or derived from induced pluripotent stem cells; and
   a cryopreservation medium comprising: about 5 w/v % dimethyl sulfoxide (DMSO), between about 0.25 w/v % and 5 w/v % disaccharide, and human serum albumin (HSA), wherein the disaccharide is sucrose.

2. The composition of claim 1, further comprising one or more inorganic salts.

3. The composition of claim 1, wherein the human serum albumin (HSA) is present at a final concentration of about 2.5% (w/v).

4. The composition of claim 1, wherein the mammalian immune cells are lymphocytes.

5. The composition of claim 4, wherein the mammalian immune cells are T cells.

6. The composition of claim 4, wherein the mammalian immune cells are natural killer (NK) cells.

7. The composition of claim 4, wherein the mammalian immune cells are induced pluripotent cell (iPSC)-derived lymphocytes.

8. The composition of claim 7, wherein the induced pluripotent cell (iPSC)-derived lymphocytes are T cells.

9. The composition of claim 7, wherein the induced pluripotent cell (iPSC)-derived lymphocytes are natural killer (NK) cells.

10. The composition of claim 1, comprising the mammalian immune cells at a concentration of about $1\times10^6$ to about $3\times10^8$ cells/mL.

11. The composition of claim 1, wherein the mammalian immune cells are activated without cytokines.

12. The composition of claim 1, wherein the mammalian immune cells are primary cells directly isolated from a non-patient donor.

13. The composition of claim 1, wherein the mammalian immune cells are primary cells directly isolated from a patient.

14. The composition of claim 1, wherein the mammalian immune cells are genetically modified.

15. The composition of claim 1, wherein the mammalian immune cells are iCART cells.

16. The composition of claim 1, comprising between 0.5 w/v % and 30 w/v % human serum albumin (HSA).

17. A composition comprising:
    mammalian immune cells that are primary cells or derived from induced pluripotent stem cells; and
    a cryopreservation medium comprising: about 5 w/v % dimethyl sulfoxide (DMSO), between about 0.25 w/v % and 5 w/v % disaccharide, and human serum albumin (HSA), further comprising cytokines, wherein the cytokines are IL-7 and IL-15.

18. The composition of claim 17, wherein IL-7 is present at a final concentration of between about 1 ng/mL and 50 ng/mL.

19. The composition of claim 17, wherein IL-15 is present at a final concentration of between about 1 ng/ml and 50 ng/mL.

20. A composition comprising:
    mammalian immune cells that are primary cells or derived from induced pluripotent stem cells; and
    a cryopreservation medium comprising: about 5 w/v % dimethyl sulfoxide (DMSO), between about 0.25 w/v % and 5 w/v % disaccharide, and human serum albumin (HSA), further comprising a mammalian cell culture medium.

21. The composition of claim 20, wherein the mammalian cell culture medium is present at between about 10 w/v % and 90 w/v %.

22. A composition comprising:
    mammalian immune cells that are primary cells or derived from induced pluripotent stem cells; and
    a cryopreservation medium comprising: about 5 w/v % dimethyl sulfoxide (DMSO), between about 0.25 w/v % and 5 w/v % disaccharide, and human serum albumin (HSA), further comprising one or more amino acids.

* * * * *